US012780339B2

(12) United States Patent
Gildert et al.

(10) Patent No.: US 12,780,339 B2
(45) Date of Patent: Nov. 3, 2026

(54) SYSTEMS, DEVICES, AND METHODS FOR A MOBILE ROBOT SYSTEM

(71) Applicant: Sanctuary Cognitive Systems Corporation, Vancouver (CA)

(72) Inventors: Suzanne Gildert, Vancouver (CA); Hessam Maleki, Burnaby (CA); Tadas Mitkus, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 309 days.

(21) Appl. No.: 18/593,030

(22) Filed: Mar. 1, 2024

(65) Prior Publication Data

US 2024/0294220 A1 Sep. 5, 2024

Related U.S. Application Data

(60) Provisional application No. 63/544,781, filed on Oct. 18, 2023, provisional application No. 63/449,132, filed on Mar. 1, 2023.

(51) Int. Cl.
*B62D 57/028* (2006.01)
*B60L 53/126* (2019.01)
(Continued)

(52) U.S. Cl.
CPC .......... *B62D 57/028* (2013.01); *B60L 53/126* (2019.02); *B60L 58/12* (2019.02); *B60L 58/22* (2019.02)

(58) Field of Classification Search
CPC ......... B60L 5/126; B60L 58/22; B62D 57/00; B62D 57/02; B62D 57/021; B62D 57/022;
(Continued)

(56) References Cited

U.S. PATENT DOCUMENTS 8,684,890 B2 * 4/2014 Bosecker ............ A61H 1/0237 482/8
8,875,594 B2 * 11/2014 Alfayad .............. B62D 57/032 901/18
(Continued)

FOREIGN PATENT DOCUMENTS

DE 102017207926 A1 * 11/2018 ............. B60L 50/60
EP 1819026 A2 * 8/2007 ........... B25J 19/005
(Continued)

*Primary Examiner* — Joshua E Rodden
(74) *Attorney, Agent, or Firm* — Adenike Adebiyi; Thomas Mahon

(57) ABSTRACT

A mobile robot system includes a mobile base and a humanoid robot. The mobile base includes a chassis having a platform. The mobile base includes a propulsion system that is coupled to the chassis and operable to propel the chassis within an environment. The humanoid robot includes a torso and two robotic legs. The humanoid robot has a first locomotion mode in which the humanoid robot is supported on the platform and travel of the humanoid robot within the environment is by movement of the mobile base within the environment. The humanoid robot has a second locomotion mode in which the humanoid robot is not supported on the platform and travel of the humanoid robot within the environment is by movement of the two robotic legs.

17 Claims, 23 Drawing Sheets

(51) Int. Cl.
*B60L 58/12* (2019.01)
*B60L 58/22* (2019.01)

(58) Field of Classification Search
CPC .. B62D 57/024; B62D 57/028; B62D 57/032; B62D 57/036; B62D 57/04
USPC .......................... 180/8.1, 8.3, 8.5, 8.6; 901/1
See application file for complete search history.

(56) References Cited

U.S. PATENT DOCUMENTS

| | | | | |
|---|---|---|---|---|
| 10,474,983 | B2 * | 11/2019 | High | G06Q 10/0833 |
| 10,946,528 | B2 * | 3/2021 | Gupta | B25J 11/0005 |
| 12,409,570 | B1 * | 9/2025 | Clerc | B25J 9/162 |
| 12,558,780 | B2 * | 2/2026 | Gildert | B25J 9/161 |
| 12,558,801 | B2 * | 2/2026 | Shannon | B25J 17/00 |
| 12,560,937 | B1 * | 2/2026 | Bernards | G05D 1/0225 |
| 2012/0048628 | A1 * | 3/2012 | Kawanami | B25J 13/085 180/21 |
| 2017/0173786 | A1 * | 6/2017 | Gildert | G06F 3/0334 |
| 2018/0141453 | A1 * | 5/2018 | High | B60L 53/37 |
| 2018/0178703 | A1 * | 6/2018 | Keck | B60P 1/43 |
| 2021/0146553 | A1 * | 5/2021 | Khadivinassab | B25J 9/104 |
| 2022/0227279 | A1 * | 7/2022 | Thrush | B60P 3/007 |
| 2024/0294219 | A1 * | 9/2024 | Gildert | B60L 58/12 |
| 2024/0316759 | A1 * | 9/2024 | Maleki | B25J 18/00 |
| 2025/0269530 | A1 * | 8/2025 | Ranjbar | B25J 19/023 |
| 2025/0296246 | A1 * | 9/2025 | Shannon | B25J 15/0009 |
| 2025/0381681 | A1 * | 12/2025 | Clerc | B25J 9/162 |

FOREIGN PATENT DOCUMENTS

| | | | | | |
|---|---|---|---|---|---|
| JP | H11285109 | A | * | 10/1999 | B60L 53/14 |
| JP | 2002154078 | A | * | 5/2002 | B25J 19/005 |
| KR | 101160163 | B1 | * | 6/2012 | H01R 13/6315 |
| WO | WO-2024120607 | A1 | * | 6/2024 | B25J 13/088 |

* cited by examiner

SYSTEMS, DEVICES, AND METHODS FOR A MOBILE ROBOT SYSTEM

CROSS-REFERENCE TO RELATED FIELDS

This application claims the benefit of U.S. Provisional Application No. 63/449,132 filed Mar. 1, 2023, and U.S. Provisional Application No. 63/544,781 filed Oct. 18, 2023, the contents of which are incorporated herein by reference.

FIELD

The field generally relates to a mobile robot system and particularly to a mobile robot system having a bipedal humanoid robot and a mobile base.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots are stationary robots. Stationary robots are not mobile and typically operate at a fixed location. Examples include stationary robots at a manufacturing plant.

Other robots are mobile robots. Mobile robots are capable of locomotion. Examples include mobile rescue robots, fire-fighting robots, and robots able to mimic human behavior. Some mobile robots are self-propelled. Some self-propelled mobile robots are capable of autonomous motion.

Some mobile robots are wheeled robots. Other mobile robots are legged robots. Legged robots may be one-legged, two-legged, or many-legged. A two-legged robot is also referred to in the present application as a bipedal robot. A bipedal robot may be a humanoid robot, for example. Legged robots may be more challenging to implement than wheeled robots, but can provide advantages, for example, on uneven terrain, stairs, and other places requiring agility in motion, as well as for accessing places designed for human access.

SUMMARY

Described herein is a technology that enables autonomous or semi-autonomous replenishment of an electrical power source on-board a bipedal humanoid robot, allowing the robot to perform its tasks with little to no interruption and/or with little to no human intervention.

In a representative example, a mobile robot system includes a mobile base comprising a chassis and a propulsion system. The chassis has a platform. The propulsion system is coupled to the chassis and operable to propel the chassis within an environment. The mobile robot system includes a humanoid robot comprising a torso and two robotic legs. The humanoid robot has a first locomotion mode in which the humanoid robot is supported on the platform and travel of the humanoid robot within the environment is by movement of the mobile base within the environment. The humanoid robot has a second locomotion mode in which the humanoid robot is not supported on the platform and travel of the humanoid robot within the environment is by movement of the two robotic legs.

In a representative example, a fleet system includes a fleet of mobile bases. Each mobile base comprises a chassis and a propulsion system. The chassis has a platform. The propulsion system is coupled to the chassis and operable to propel the chassis within an environment. The fleet system includes a fleet of humanoid robots. Each humanoid robot comprises a torso and two robotic legs. The humanoid robot has a first locomotion mode in which the humanoid robot is supported on the platform of a given mobile base and travel of the humanoid robot within the environment is by movement of the given mobile base within the environment. The humanoid robot has a second locomotion mode in which the humanoid robot is not supported on any of the platforms of the mobile bases and travel of the humanoid robot within the environment is by movement of the two robotic legs. The fleet system includes a fleet system controller comprising at least one processor and at least one non-transitory processor-readable memory. The fleet system controller is communicatively coupled to the fleet of mobile bases and the fleet of humanoid robots. The fleet system controller receives operational state data from the humanoid robots and the mobile bases and schedules tasks for the humanoid robots and the mobile bases based on the operational data.

In a representative example, a mobile base includes a chassis having a platform. The platform has a first platform area sized and dimensioned to receive a humanoid robot. The mobile base includes a plurality of wheels coupled to the chassis. The mobile base includes a propulsion system coupled to the chassis and at least one of the plurality of wheels. The propulsion system is operable to propel the chassis within an environment. The mobile base includes a mobile base controller comprising at least one processor and at least one non-transitory processor-readable memory. The mobile base controller is configured to control navigation of the chassis within the environment. The mobile base includes an electrical power source coupled to the propulsion system and the mobile base controller. The electrical power source has a stored energy level that changes with energy usage of the propulsion system and the mobile base controller. The mobile base includes a first charging interface coupled to the first platform area and electrically connected to the electrical power source, the first charging interface including at least one of a charging port or wireless charger transmitter for charging a humanoid robot received on the first platform area.

In a representative example, a mobile robot system includes a robot and a mobile base. The robot comprises a torso, a first robotic arm mechanically coupled to the torso, a first robotic leg, and a second robotic leg. The first robotic leg and the second robotic leg are controllably actuatable to enable the robot to execute bipedal walking. The mobile base comprises a platform to receive a lower end of the first robotic leg and a lower end of the second robotic leg, at least one wheel and a controllable steering mechanism to enable the mobile base to travel both while the robot is positioned on the platform and while the robot is not positioned on the platform, and a plurality of components, at least one component of the plurality of components operable to support at least one function of the robot.

BRIEF DESCRIPTION OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1A:
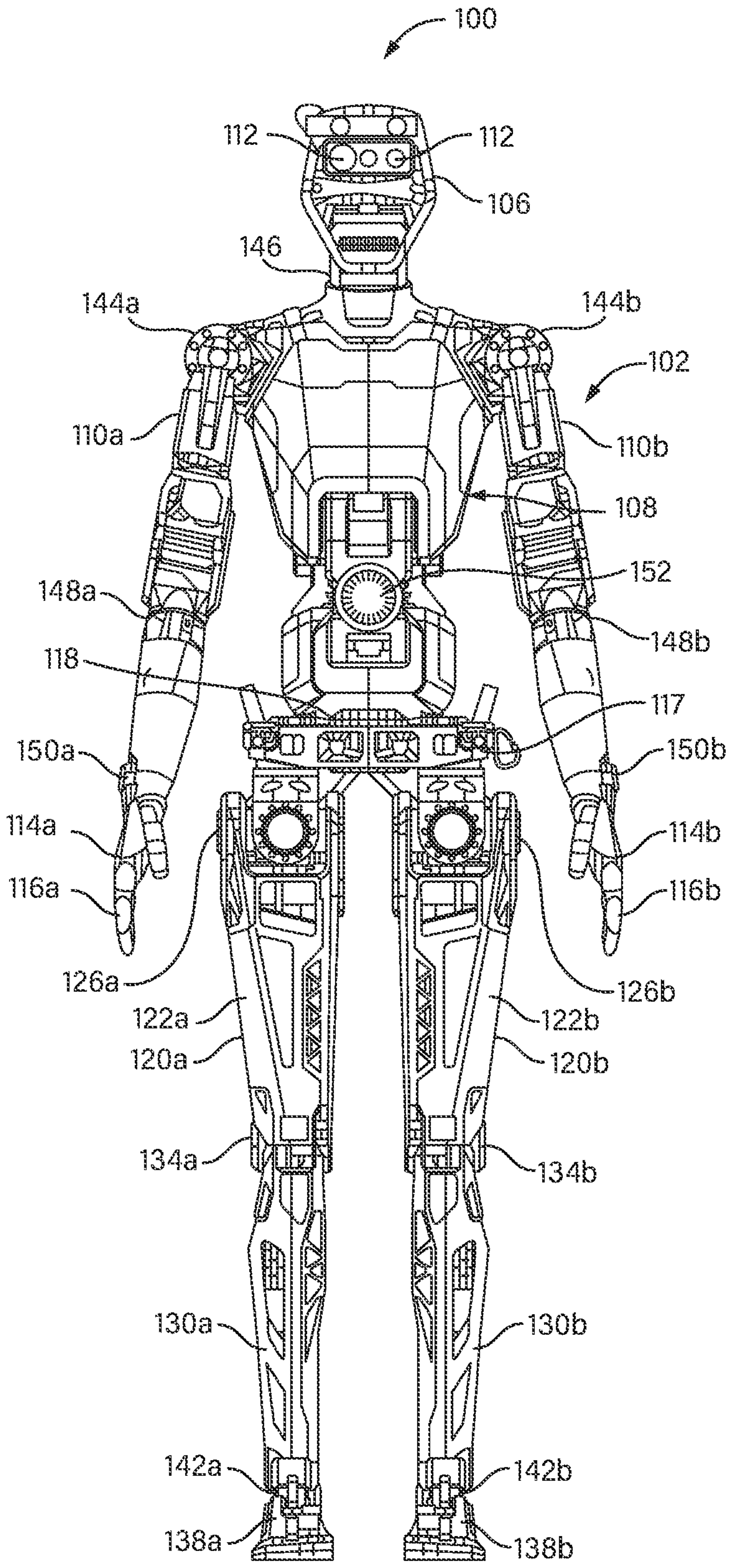
FIG. 1A is an isometric view of a robot.

The following description sets forth specific details in order to illustrate and provide an understanding of various examples and embodiments of the present systems, devices, and methods. A person of skill in the art will appreciate that some of the specific details described herein may be omitted or modified in alternative examples and embodiments, and that the various examples and embodiments described herein may be combined with each other and/or with other methods, components, materials, etc. in order to produce further examples and embodiments.

In some instances, well-known structures and/or processes associated with computer systems and data processing have not been shown or provided in detail in order to avoid unnecessarily complicating or obscuring the descriptions of the examples and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "examples" and "the examples," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

Example I—Overview

A robot may be a humanoid robot, that is, having an appearance and/or a character resembling that of a human. A humanoid robot may be "humanoid" in its entirety or may have humanoid components (e.g., a torso, head, arms, and hands) coupled to non-humanoid components (e.g., a wheeled base). It may be advantageous for a humanoid robot to be a bipedal robot. Furthermore, it may be advantageous for the humanoid robot to be untethered (e.g., not physically coupled, tied, or fastened to anything), able to mimic the complex movements of humans, and free to move around its environment. In some examples, it may be advantageous for the humanoid robot to be capable of autonomous movement and action.

The technology described herein includes systems and methods for a mobile robot system having a humanoid robot and a mobile base. In some examples, the humanoid robot can be a bipedal humanoid robot. In some examples, the bipedal humanoid robot can be capable of walking and stepping on and off a platform of the mobile base. One advantage of a bipedal humanoid robot is that the robot can form various poses by articulating its legs and torso at one or more joints. This capability can increase the range of work that can be assigned to the robot (e.g., the robot can bend forward to pick an object on the ground or close to the ground. The bipedal humanoid robot has two locomotion modes.

The bipedal humanoid robot can walk independently of the mobile base. In some operational scenarios when the robot needs to travel to a destination outside the walking range of the robot, or needs to get to a destination faster than the robot could by walking, the mobile robot system can arrange for the robot to be transported to the destination by the mobile base. For example, the mobile robot system can summon the mobile base to the robot (or the robot can summon the mobile base directly), whereupon the robot can step onto the mobile base and be transported to the destination by the mobile base. The robot can be in a standing or seated position on the mobile base. In such examples, navigation of the robot and mobile base may be controlled by the robot (e.g., the robot may steer the mobile base) or by the mobile base (e.g., the mobile base may steer itself).

The degree of mobility of the mobile base can vary. For example, the mobile base may be constrained to move along a fixed track or may be capable of autonomous and unconstrained movement. In some examples, the mobile base may carry various components in support of robot operation (e.g., components of a hydraulic system, a controller, computing resources, a battery, an electric motor, etc.). In some examples, the mobile base can serve as a mobile ancillary unit capable of carrying components that would otherwise be too bulky or heavy to include in the robot. In some examples, the mobile base can be a mobile docking station to which the robot can return for various needs (e.g., charging, data processing, servicing, and maintenance).

In some examples, the robot can have an on-board electrical power source (e.g., an on-board battery) used to provide electrical power to the robot for robot operations. In some examples, the on-board electrical power source can be rechargeable or replaceable. In some examples, the technology allows for autonomous or semi-autonomous replacement, recharging, and/or replenishment of the electrical power source so that the robot can perform its tasks with minimal interruption and with little or no human intervention.

In some examples, the mobile base can have an on-board electrical power source (e.g., an on-board battery) that has a larger capacity than the electrical power source of the robot and that is operable to replenish (e.g., charge) the on-board electrical power source of the robot. In some examples, the on-board electrical power source of the robot can be automatically replenished (e.g., charged) whenever the robot is docked to the mobile base. In other examples, when the on-board electrical power source of the robot is in a low-power condition (e.g., a stored energy level of the electrical power source is below a threshold) and the robot is not currently docked to the mobile base, the robot can travel to the mobile base for charging. Charging can be performed using a tethered electrical coupling between the robot and the mobile base or wirelessly (e.g., by inductive charging between inductive charging components on the mobile base and the robot). In some examples, the mobile base can carry a spare electrical power source that can be exchanged for the electrical power source on the robot.

In some examples, the technology can include a power source exchange station having a repository of replacement electrical power sources that are compatible with the robot. In some examples, when an electrical power source of the robot is in a low-power condition, the robot can travel to the power source exchange station to exchange the on-board electrical power source. In some example, exchanging the on-board electrical power source can include an actual exchange of the electrical power source (or components thereof) with one of the replacement electrical power sources in the repository or replenishing the on-board electrical power source using resources in the power source exchange station. In some examples, the power source exchange can be achieved autonomously (e.g., without human intervention) or semi-autonomously (e.g., with some human intervention).

In some examples, the technology can include a fleet of robots and a fleet of mobile bases. In some examples, any robot from the fleet of robots can interact with any mobile base from the fleet of mobile bases (e.g., the mobile bases are interchangeable). In other examples, some robots from the fleet of robots can only interact with some mobile bases from the fleet of mobile bases. For example, the fleet of robots can have different types of robots with different requirements for mobile bases. In such cases, mobile bases can be tailored to the different types of robots rather than being general purpose.

In some examples, the technology can include a fleet system controller that can track positions and movements of the robots and mobile bases within an environment. In some examples, the fleet system controller can receive updates on the power conditions of the robots in the fleet of robots and use the updates to schedule energy replenishment tasks for the robots.

Example II—Example Bipedal Robot

FIG. 1A illustrates an example robot 100 including a robot body 102 having a humanoid form. Although the robot body 102 has a humanoid form, the examples described herein are not limited to robot bodies having a humanoid form. The robot body 102 can include a robotic head 106, a robotic torso 108, robotic arms 110*a*, 110*b*, robotic hands (or end effectors) 114*a*, 114*b*, and robotic legs 120*a*, 120*b*. Although the robot 100 is illustrated as a bipedal robot, the technology described herein is not limited to bipedal robots (e.g., robots with four robotic legs can benefit from the technology described herein). In examples herein, the robot 100 is capable of walking independently using the robotic legs 120*a*, 120*b*.

The robotic arms 110*a*, 110*b* are coupled to opposite sides of the robotic torso 108. Each robotic hand (or end effector) 114*a*, 114*b* is coupled to a respective robotic arm 110*a*, 110*b*. The robotic hands 114*a*, 114*b* can include one or more digits or fingers 116*a*, 116*b*. Each digit 116*a*, 116*b* can have one or more actuated joints corresponding to one or more degrees of freedom (DOFs). Each hand 114*a*, 114*b* can include one or more actuators arranged to control the angles at the joints of the respective digits.

The robotic head 106 can include one or more image sensors 112 that can capture visual data representing an environment of the robot. Data collected by the sensors 112 can be used for various purposes, such as navigation within the environment or identifying an object in the environment. The robot 100 can include other sensors that can collect data representing the environment of the robot (e.g., audio sensors, tactile sensors, accelerometers, inertial sensors, gyroscopes, temperature sensors, humidity sensors, or radiation sensors).

In some examples, the robotic torso 108 is coupled to a torso base 117 by a torso joint 118. In some examples, the torso joint 118 can be an actuatable joint (e.g., a position or angle of the joint can be changed by operation of an actuator). In some examples, the torso joint 118 can include an actuator (e.g., an electric motor) having a first actuator part (e.g., an actuator housing) coupled to the torso base 117 and a second actuator part (e.g., an actuator output) coupled to the torso 108. The actuator of the torso joint 118 can be operated to rotate the robotic torso 108 relative to the torso base 117 (e.g., in order to bend the robotic torso 108 forward or return the robotic torso 108 from a forward bend position to an upright position).

In some examples, the robotic legs 120*a*, 120*b* can have upper leg members 122*a*, 122*b*, lower leg members 130*a*, 130*b*, and feet 138*a*, 138*b*. The upper leg members 122*a*, 122*b* are coupled to the torso base 117 by hip joints 126*a*, 126*b*. In some examples, the hip joints 126*a*, 126*b* can be actuatable joints (e.g., a position or angle of the joint can be changed by operation of an actuator). For example, the hip joints 126*a*, 126*b* can include actuators (e.g., electric motors) that are operable to rotate the torso base 117 relative to the upper leg members 122*a*, 122*b* (e.g., in order to bend the robotic torso 108 and torso base 117 forward or to return the robotic torso 108 and torso base 117 from a forward bend position to an upright position).

The upper leg members 122*a*, 122*b* are coupled to the lower leg members 130*a*, 130*b* by knee joints 134*a*, 134*b*, which can be actuatable joints (e.g., include actuators) that can be controlled to rotate the lower leg members 130*a*, 130*b* relative to the upper leg members 122*a*, 122*b*. The lower leg members 130*a*, 130*b* are coupled to the feet 138*a*, 138*b* by ankle joints 142*a*, 142*b*. In some examples, the ankle joints 142*a*, 142*b* can be actuatable joints that can allow the lower leg members 130*a*, 130*b* to pivot relative to the feet 138*a*, 138*b*. In some examples, actuation of the knee joints 134*a*, 134*b* and ankle joints 142*a*, 142*b* can be coupled such that actuation of the knee joints 134*a*, 134*b* can cause actuation of the ankle joints 142*a*, 142*b* (e.g., in order to enable the lower legs members 130*a*, 130*b* to pivot relative to the feet 138*a*, 138*b* without lifting the feet off the ground).

The robot body 102 can include several other joints besides the torso joint 118, hip joints 126*a*, 126*b*, knee joints 134*a*, 134*b*, and ankle joints 142*a*, 142*b*. For example, the robot body 102 can include shoulder joints 144*a*, 144*b* between the robotic arms 110*a*, 110*b* and robotic torso 108. The robot body 102 can include a neck joint 146 between the robotic head 106 and robotic torso 108. The robotic arms 110*a*, 110*b* can include elbow joints 148*a*, 148*b*. Wrist joints 150*a*, 150*b* can be formed between the robotic arms 110*a*, 110*b* and the robotic hands 114*a*, 114*b*. The robotic torso 108 can include various other joints, such as a joint 152 that allows flexion-extension of the torso 108. The joints in the robot body 102 can provide degrees of freedom that can be controlled by actuators.

In some examples, the actuators that actuate the joints in the robotic hands 114*a*, 114*b* can be hydraulic actuators. The robot 100 can include a hydraulic system that can power the hydraulic actuators in the robot (see Example VI). In some examples, some or all of the components of the hydraulic system can be adapted and/or miniaturized to fit at least partially inside the robot (e.g., inside torso 108 and/or robotic arms 110*a*, 110*b*). In some examples, a hydraulic power unit of the hydraulic system can be attached to the robotic torso 1108, and hydraulic lines can extend from the hydraulic power unit to the hydraulic actuators through passages in the robot (such as passages inside the torso 108 and/or robotic arms 110*a*, 110*b*).

Figure 1B:
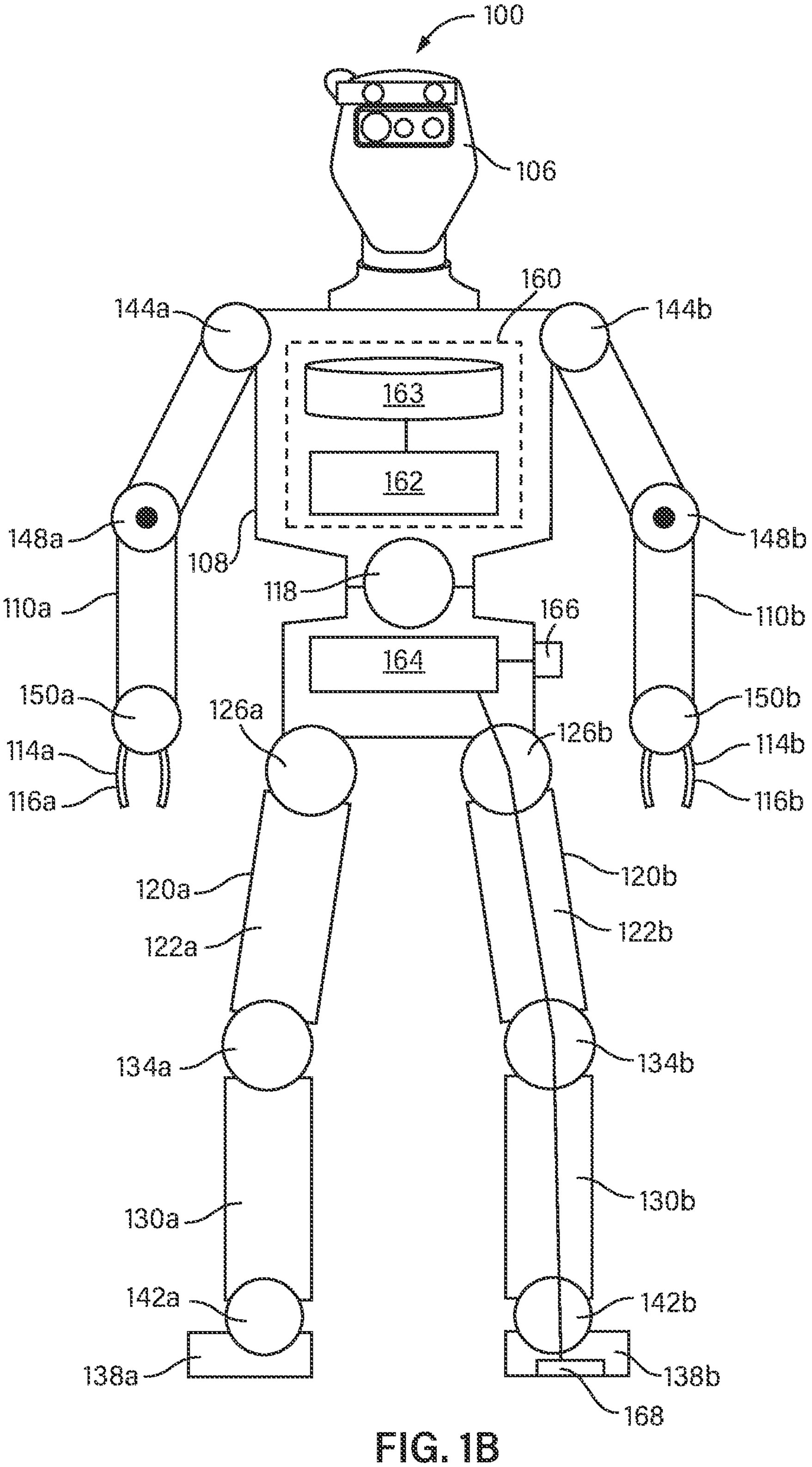
FIG. 1B is a simplified system diagram of the robot illustrated in FIG. 1A.

FIG. 1B is a simplified system diagram of the robot 100. As illustrated in FIG. 1B, the robot 100 can include a robot controller 160 that can control operation of the robot body 102 and process data for the robot body 102. The robot controller 160 can include at least one processor 162 and at least one non-transitory processor-readable storage medium 163 communicatively coupled to the at least one processor 162. In some examples, the robot controller 160 can control operation of the actuators in the joints of the robot body 102.

The robot 100 can include a primary electrical power source 164 that can provide electrical power to electrical components of the robot body 102 (e.g., the robot controller 160 and electrically-powered joint actuators). The primary electrical power source 164 can be located within the robotic torso 108 or can be located within an auxiliary unit that can be attached to the robotic torso 108 (e.g., as a backpack).

In one example, the robot body 102 can include a charging interface 166 electrically coupled to the primary electrical power source 164 to allow charging of the primary electrical power source 164. The charging interface 166 can include, for example, a charging port (e.g., a socket) that can receive a charging cable connected to an external power supply.

In another example, the robot body 100 can include a wireless charger receiver 168 (e.g., an induction coil) electrically coupled to the primary electrical power source 164. The wireless charger receiver 168 can allow wireless charging (e.g., induction charging) of the primary electrical power source 164 (e.g., by interaction with a wireless charger transmitter). In one example, the wireless charger receiver 168 can be located on one of the feet of the robot (e.g., foot 138*b*) such that wireless charging of the primary electrical power source 164 can occur through the feet of the robot. In another example, the wireless charger receiver 168 can be located on another part of the robot that can rest against a charging interface with a wireless charger transmitter (e.g., on a back portion of the upper leg member 122*b*).

Example III—Example Mobile Base

Figure 2A:
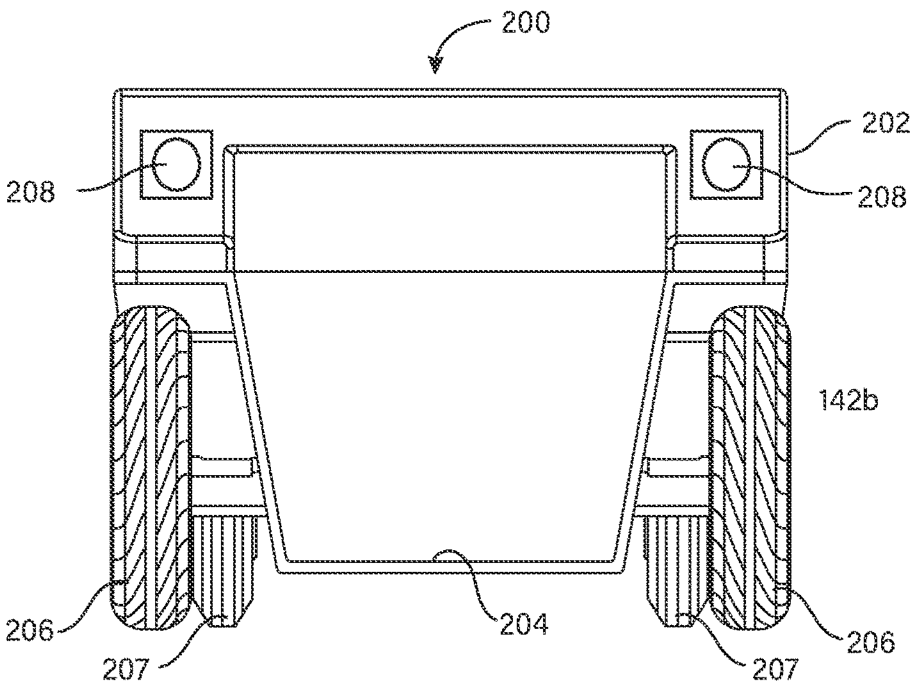
FIG. 2A is a front view of a mobile base.

FIG. 2A illustrates a mobile base 200 that can be used by a robot for locomotion. In the illustrated example, the mobile base 200 includes a chassis 202 having a platform 204 that can support a robot (e.g., the robot 100 in Example II). The mobile base 200 can in some examples be a wheeled base having front wheels 206 and rear wheels 207 coupled to the chassis 202.

Figure 2B:
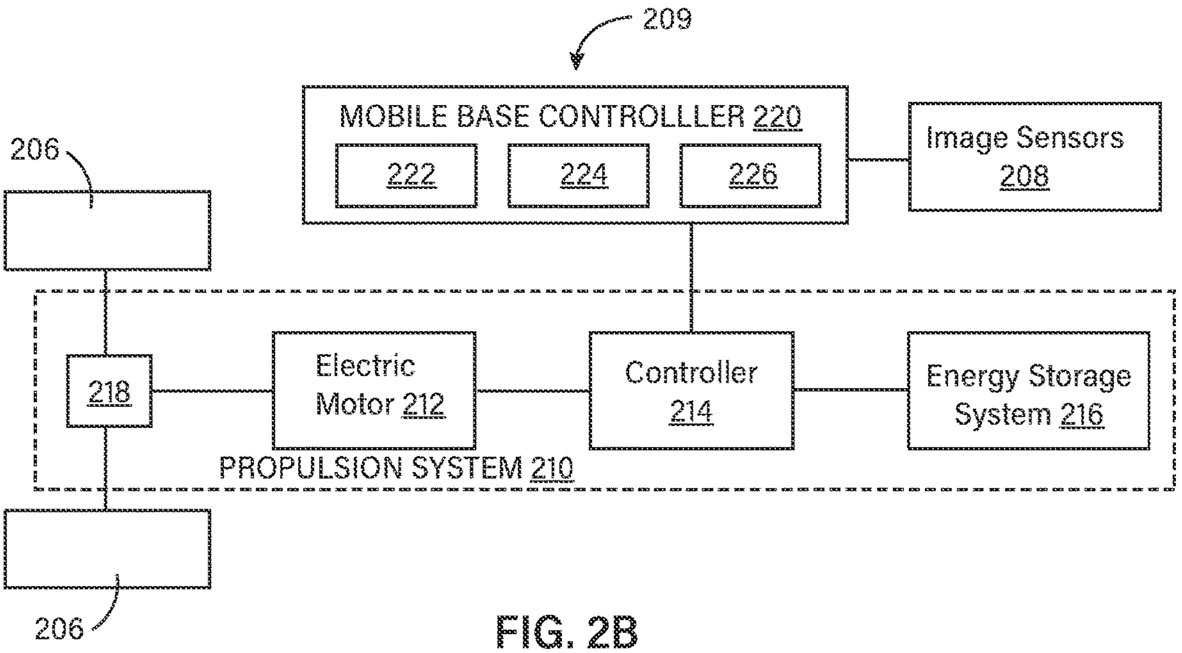
FIG. 2B is a block diagram of a system of components that can be housed in the mobile base of FIG. 2A.

FIG. 2B illustrates a system 209 of components that can be housed in a hatch of the chassis 202 or otherwise attached to the chassis 202.

The system 209 can include a propulsion system 210 that can be coupled to the front wheels 206 (or both the front and back wheels 206, 207) of the mobile base 200. In some examples, the propulsion system 210 can be an electric propulsion system. For example, the propulsion system 210 can include an electric motor 212, a controller 214, an energy storage system 216 (e.g., battery), a transmission device 218, and the wheels 206. The transmission device 218 transmits the output of the electric motor 212 to the wheels 206. The energy storage system 216 provides electrical power to the electronic motor 212 and controller 214. In some examples, the propulsion system 210 can include an energy generator (e.g., fuel cell) that can generate energy on-board to replenish the energy storage system 216. In other examples, the energy storage system 216 can be replenished by charging from an external power supply.

The mobile base 200 can include a mobile base controller 220 that controls operations of the mobile base 200 (e.g., navigation of the mobile base). The mobile base controller 220 can include at least one processor 222, at least one non-transitory processor-readable storage medium 224 communicatively coupled to the at least one processor 222, and a wireless communication interface 226 (or wired communication interface). The processor 222 may be any logic processing unit, including for example, one or more central processing units ("CPUs"), digital signal processors ("DSPs"), and/or application-specific integrated circuits ("ASICs"). The storage medium 224 may be any suitable non-volatile storage medium, including for example, a hard disk drive for reading from and writing to a hard disk, a solid-state drive, an optical disk drive for reading from and writing to removable optical disks, and/or a magnetic disk drive for reading from and writing to magnetic disks. The storage medium 224 can store instructions and data that when executed by the processor 222 navigate the mobile base within a space.

The mobile base controller 220 may communicate with the controller 214 of the propulsion system 210. In some examples, the energy storage system 216 associated with the propulsion system 210 can be a primary electrical power source of the mobile base 200 and can power other components in the mobile base 200. For example, the energy storage system 216 can power the mobile base controller 220. In some examples, the platform 204 can include a charging interface that is connected to the energy storage system 216 and that allows a chargeable device (e.g., a robot) supported on the platform 204 to be charged from the energy storage system 216 (see Example XI).

In some examples, the mobile base 200 can be an autonomous vehicle (e.g., the mobile base can navigate a space without robot or human assistance). In some examples, the mobile base 200 can include one or more image sensors 208 (e.g., cameras) that capture visual data representing an environment of the mobile base 200. The mobile base controller 200 may receive data from the image sensors 208 and other sensors and use the data to control navigation of the mobile base 200 within a space. In some examples, the mobile base 200 can include other sensors to enable autonomous or semi-autonomous navigation.

Example IV—Example Mobile Robot System

Figure 3A:
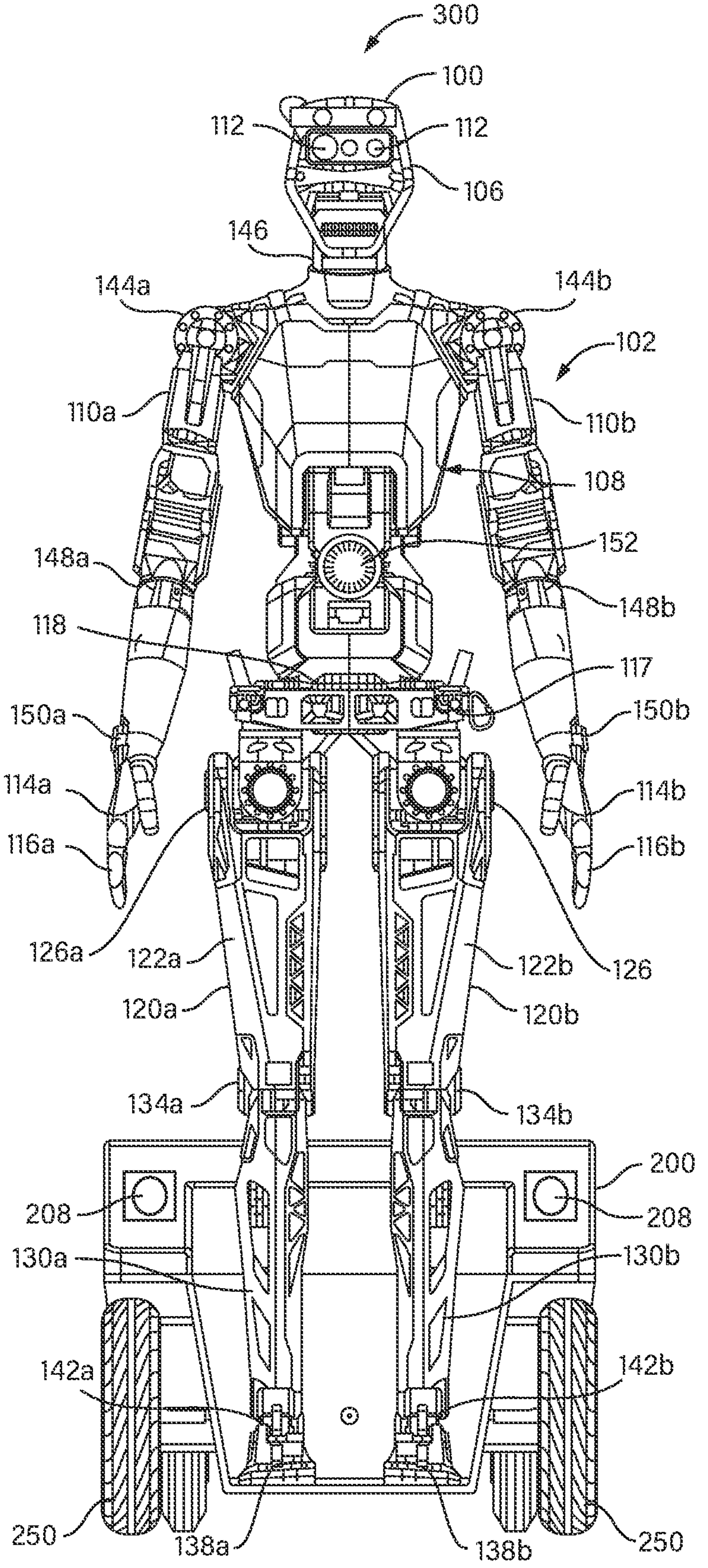
FIG. 3A is a front view of a mobile robot system.

FIG. 3A illustrates a mobile robot system 300 including the robot 100 and the mobile base 200. The robot 100 is shown standing on the platform 204 of the mobile base 200. In some examples, the robot 100 can step onto and step off the platform 204 without human assistance. In some examples, the robot 100 is capable of autonomous travel (e.g., via bipedal walking) and can travel independently of the mobile base.

The robot 100 may perform tasks while supported on the platform 204 of the mobile base 200. The robot body 102 has articulable joints that allow the robot 100 to form various stable poses. For example, the robot 100 can be configured into a particular stable pose to perform a particular task. The ability of the robot body 102 to have various articulations, including articulations of the robotic legs 120*a*, 120*b*, can be advantageous in operation. In some examples, various articulations can be configured using the torso joint 218, the hip joints 126*a*, 126*b*, the knee joints 134*a*, 134*b*, and the ankle joints 142*a*, 142*b* (see Example II).

Figure 3B:
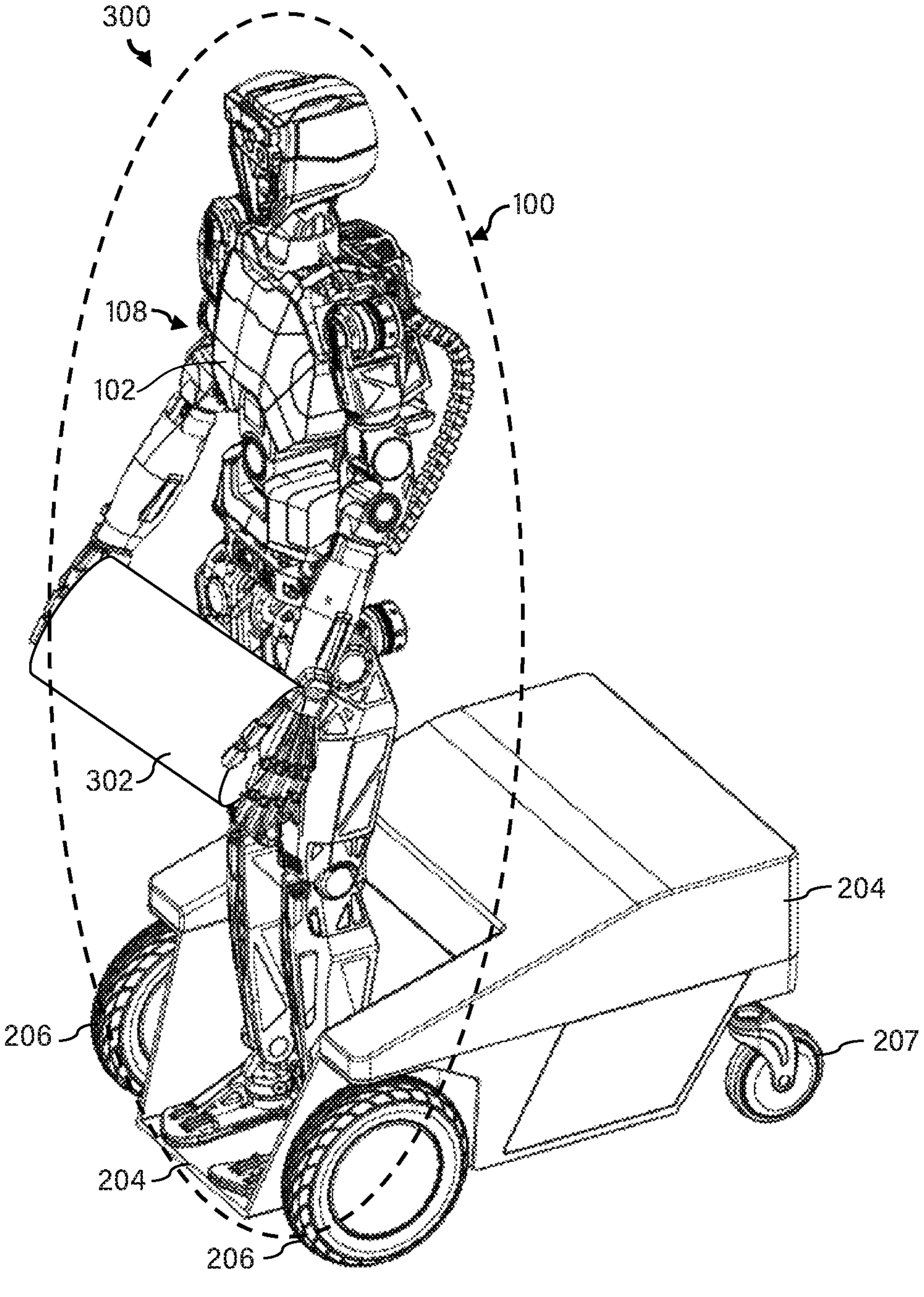
FIG. 3B is a perspective view of the mobile robot system of FIG. 3A illustrating the robot carrying a load.
Figure 3C:
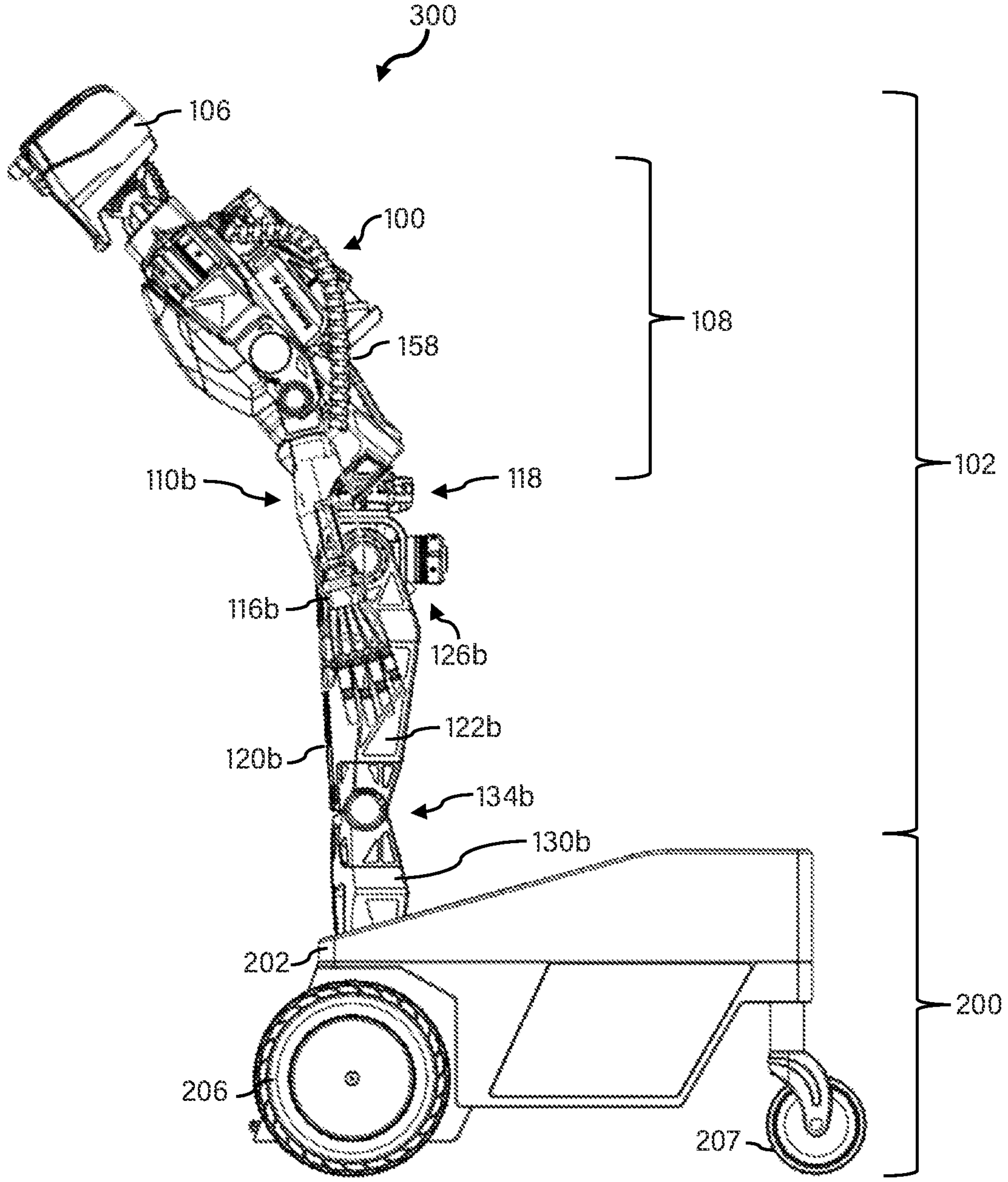
FIG. 3C is a side view of the mobile robot system of FIG. 3A illustrating the robot in a bent pose.
Figure 3D:
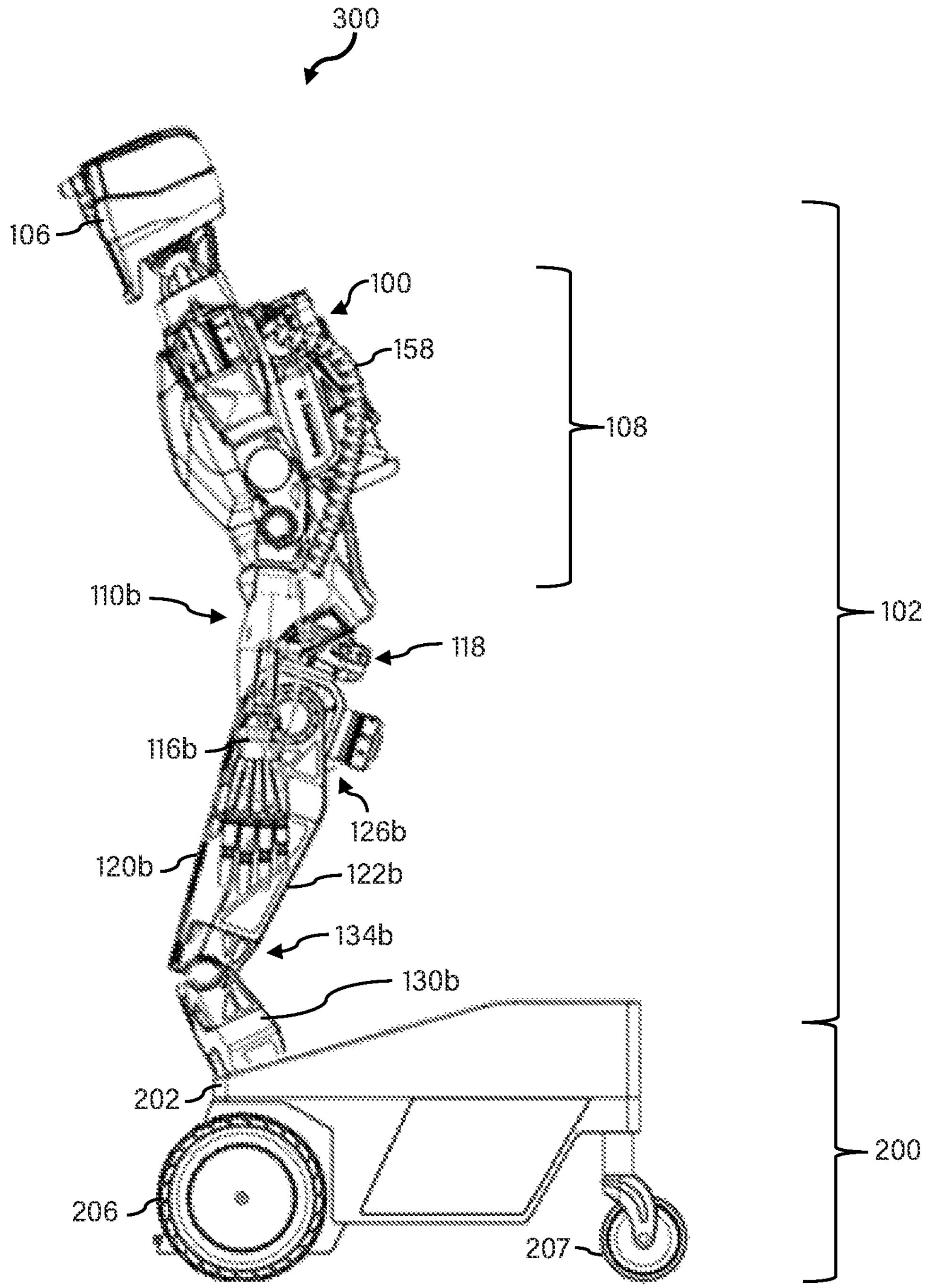
FIG. 3D is a side view of the mobile robot system of FIG. 3A illustrating the robot in a another bent pose.

For illustrative purposes, FIG. 3B shows the robot 100 carrying a load 302 while standing on the platform 204 of the mobile base 200. The load 302 may be an object picked up by the robot 100, for example. The load 302 may be picked up from the ground, or from a shelf, including for example, a shelf low to the ground or a shelf above robotic torso 108. The load 302 may be an object handed to the robot 100 by a human or another robot. To pick the load 302 up, the robot 100 may need to bend forward while standing on the platform as shown in FIGS. 3C and 3D. In FIG. 3C, the robot 100 is bent at the torso joint 118. In FIG. 3D, the robot 100 is bent at the knee joints 134*a*, 134*b*.

The robot 100 is configured to be stable in each of the possible articulations. In some examples, the mobile base 204 has a weight, shape, and/or measurable extent that ensures the mobile robot system 300 is stable (e.g., will not tip over) when the robot 100 is configured in the various articulations, and when each of a load weight, shape, and measurable extent are less than a respective determined threshold value.

Example V—Additional Example Mobile Robot Systems

Figure 4A:
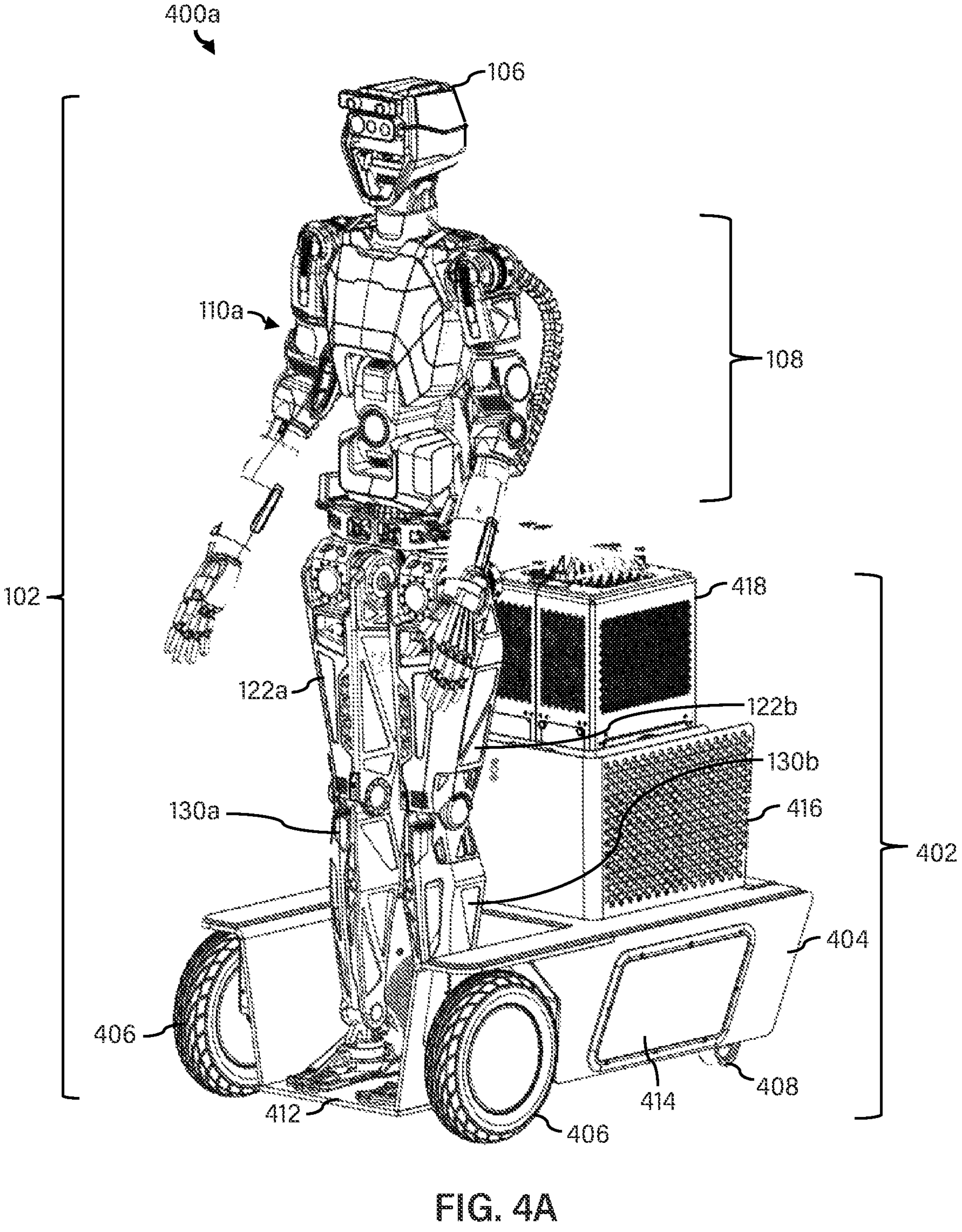
FIG. 4A is a perspective view of another mobile robot system.

FIG. 4A illustrates a mobile robot system 400*a* including the robot 100 and a mobile base 402 having a chassis 404. The mobile base 402 can include wheels 406, 408 coupled to the chassis 404 and driven by a propulsion system (see Example III). The chassis 404 can include a platform 412 on which the robot 100 can be situated. The chassis 404 can include a hatch 414 that can open to provide access to various components housed in the chassis (e.g., components of a propulsion system). In some examples, the mobile base 402 can include components 416 and 418 mounted on the chassis 404. In some examples, the component 416 can include an electric motor and/or hydraulic or pneumatic components, and the component 418 can include a battery and/or compute resources (e.g., computer processors and/or non-transitory processor-readable storage media). The components 416, 418 can be resources that are used by the robot 100. For example, the robot 100 can be charged using the battery in component 418.

Figure 4B:
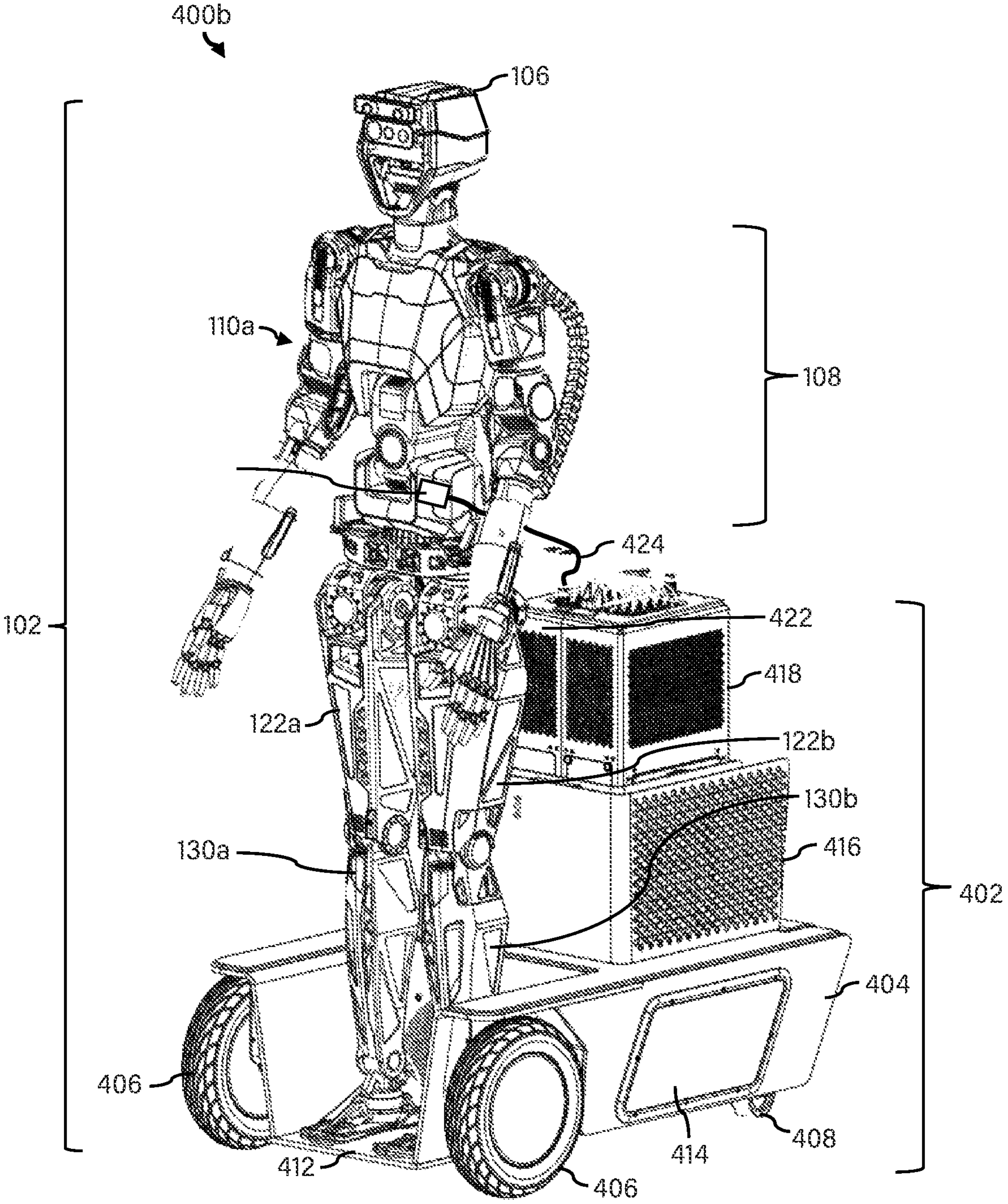
FIG. 4B is a perspective view of the mobile robot system of FIG. 4A with a tethered electrical communicative coupling between a robot and a mobile base.

FIG. 4B illustrates a mobile robot system 400*b* including the robot 100, the mobile base 202, and a tethered electrical communicative coupling 424 between the robot 100 and the mobile base 402. In the illustrated example, the robot 100 includes a primary electrical power source 420 (e.g., a battery), and the component 418 mounted on the chassis 404 of the mobile base 402 includes a primary electrical power source 422 (e.g., a battery). In some examples, the tethered electrical communicative coupling 424 is formed between the electrical power sources 420, 422. The tethered electrical communicative coupling 424 can include one or more electrical cables. The primary electrical power source 422 of the component 418 may provide power to the primary electrical power source 420 of the robot 100 through the tethered electrical communicative coupling 424.

Figure 4C:
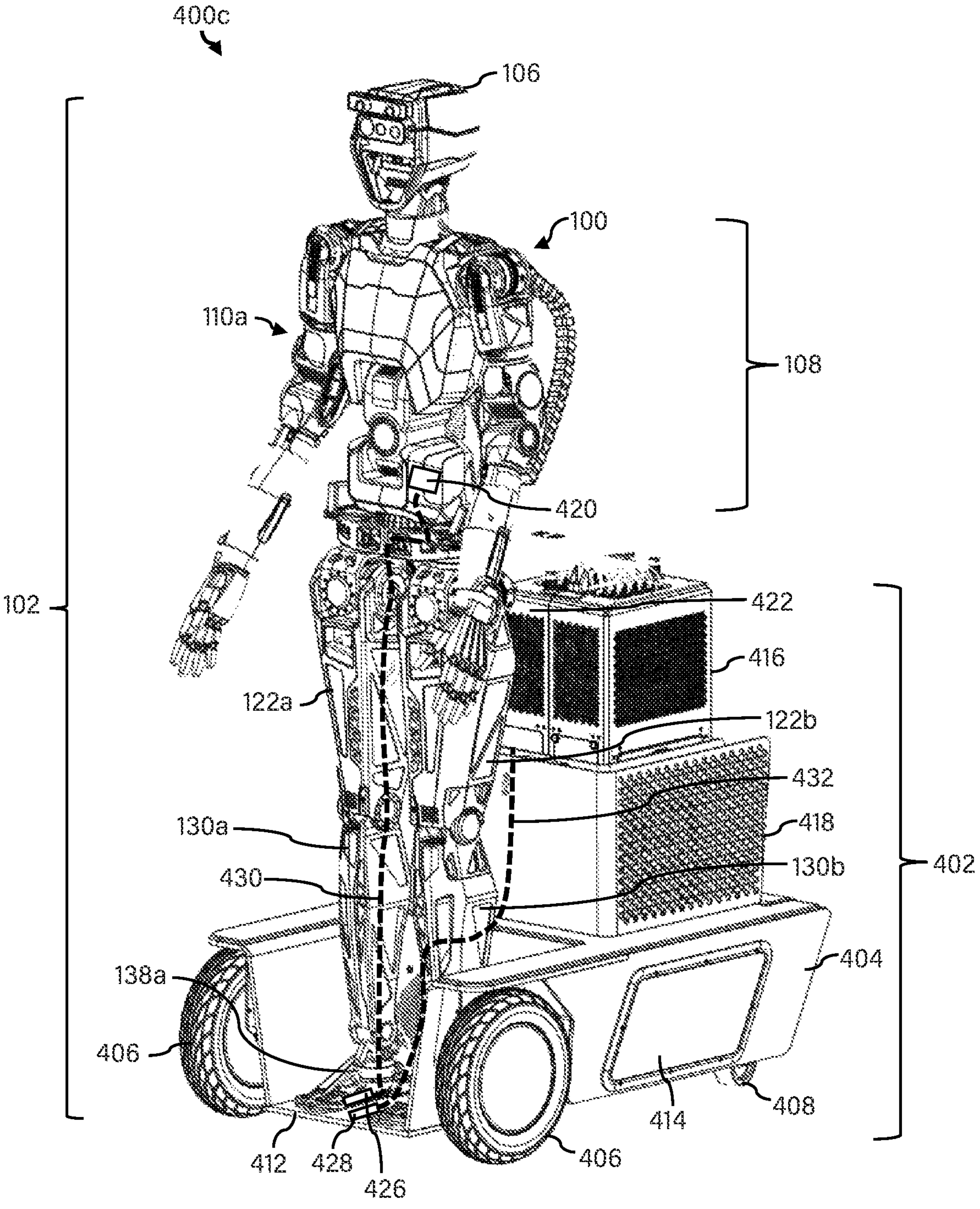
FIG. 4C is a perspective view of the mobile robot system of FIG. 4A with a wireless electrical communicative coupling between a robot and a mobile base.

FIG. 4C illustrates a mobile robot system 400*c* including the robot 100, the mobile base 402, and a wireless electrical communicative coupling between the robot 100 and the mobile base 402. In the illustrated example, the wireless electrical communication coupling includes an induction coil 426 attached to a foot of the robot 100 (e.g., the foot 138*a*) and an induction coil 428 attached to the platform 412 of the mobile base 402. The induction coils 426 and 428 may be used to provide induction charging of the primary electrical power source 420 by the primary electrical power source 422. In other examples, the induction coils 426 and 428 can be in other locations on the robot 100 and the mobile base 402, respectively. The induction coil 426 can be electrically communicatively coupled to the primary electrical power source 420 by an electrical cable 430. The induction coil 428 can be electrically communicatively coupled to the primary electrical power source 422 by an electrical cable 432. In FIG. 4C, electrical cables 430 and 432 are shown as dotted lines to indicate that electrical cables 430 and 432 may run through an interior of robot body 102 and mobile base 402, respectively.

Figure 5:
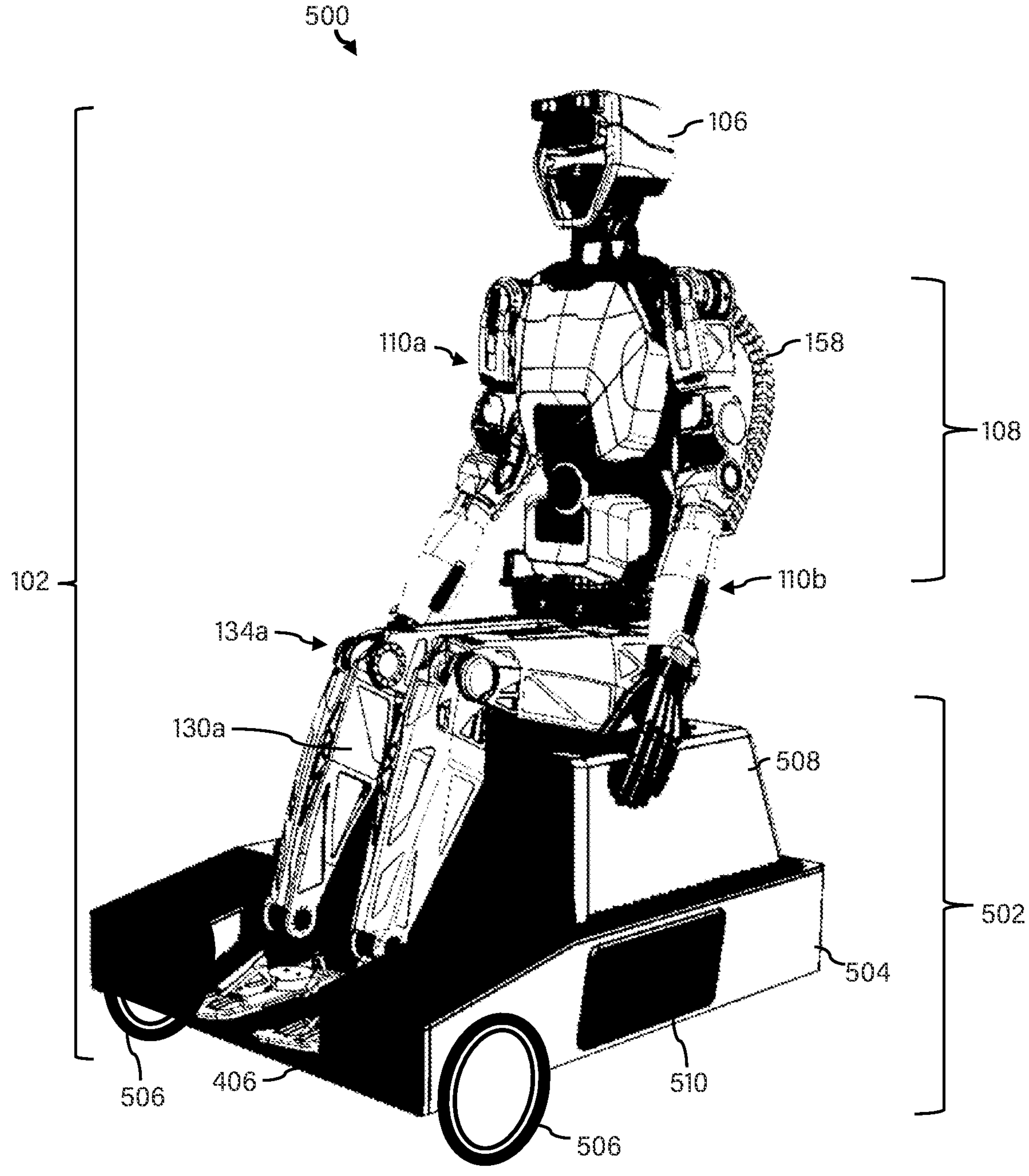
FIG. 5 is a perspective view of a mobile robot system with a robot in a seated position on a mobile base.

FIG. 5 illustrates a mobile robot system 500 including the robot 100 in a seated position on a mobile base 502. The mobile base 502 includes a chassis 504 having a platform 406. The mobile base 502 can include wheels 506 coupled to the chassis 504 and a propulsion system to drive the wheels (see Example III). The chassis 504 can include a seat 508 adjacent to the platform 506 for the robot 100. The mobile base 802 can include a hatch 410 that can be opened to access various components housed in the chassis 504. The components housed in the chassis 454 may include a controller, storage media, components of a hydraulic system, a battery, an electric motor and/or components of a propulsion.

Example VI—Hydraulic Robot

Figure 6:
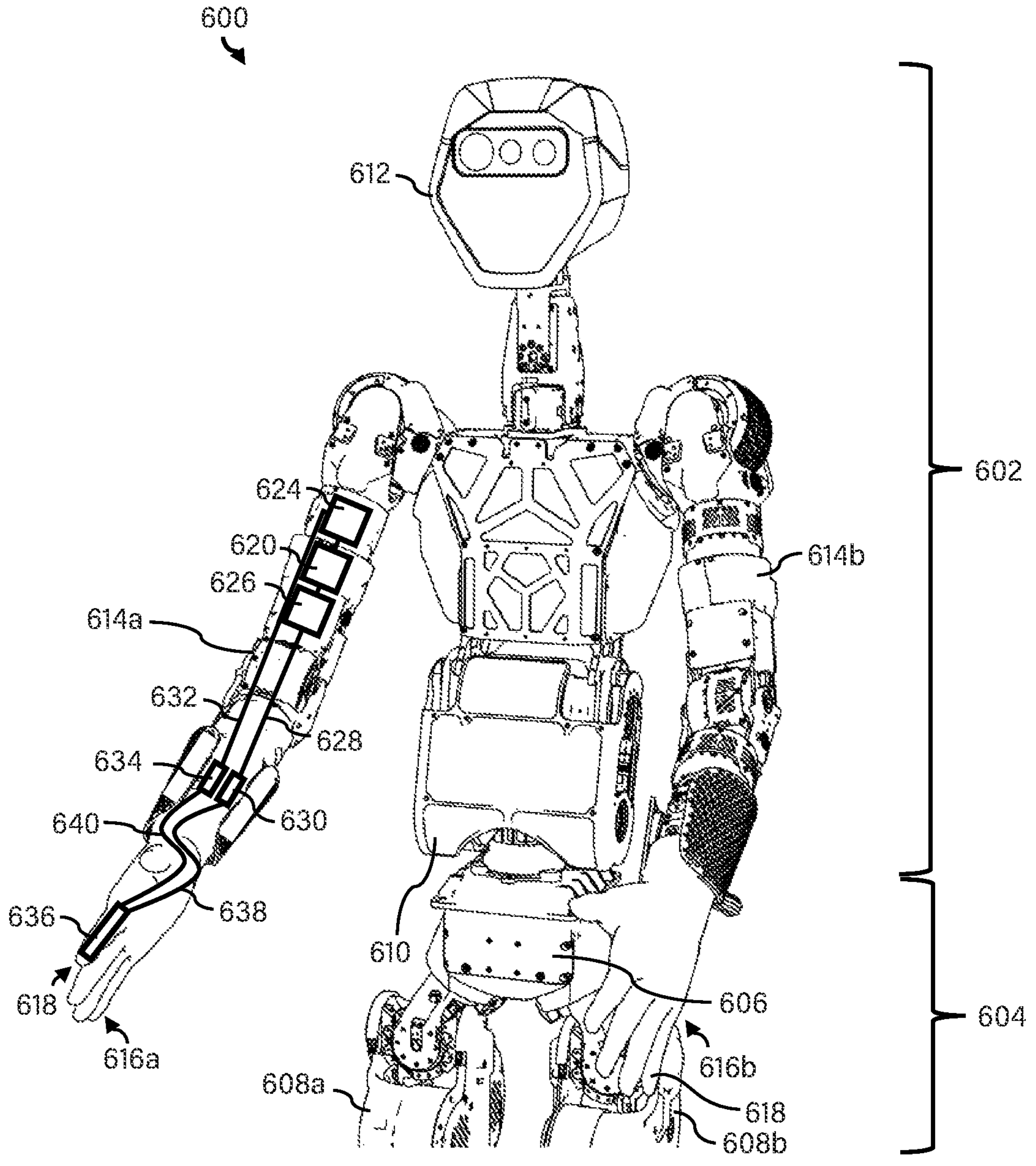
FIG. 6 is a schematic drawing of a hydraulic robot.

FIG. 6 illustrates an example hydraulic robot 600 having components that can be powered by hydraulics. The hydraulic robot 600 can be used in a mobile robot system, such as any of the mobile robot systems described in Examples IV and V.

The hydraulic robot 600 can include a humanoid lower body 602 and a humanoid upper body 604. The lower body 602 includes a pelvic region 606 and two legs 608*a* and 608*b* (only the upper portions of legs 608*a*, 608*b* are shown in FIG. 6). The upper body 604 includes a torso 610, a head 612, robotic arms 614*a*, 614*b*, and hands (or end effectors) 616*a*, 616*b*. The robotic arms 614*a*, 614*b* can be humanoid arms. In other examples, the robotic arms 614*a*, 614*b* can have a form factor that is different from a form factor of a humanoid arm. The hands 616*a*, 616*b* can be humanoid hands or can have a form factor that is different from a form factor of a humanoid hand. Each of the hands 616*a*, 616*b* can include digits 618 (e.g., fingers, thumbs, or similar structures of the hand or end effector).

The robot 600 includes a hydraulic control system that can be housed in the lower body 602 and/or the torso 610 of the upper body 604, or located outside of the robot (e.g., on a wheeled unit that can roll with the robot as the robot moves around), or located in a fixed station to which the robot is tethered. The hydraulic control system can include a hydraulic pump 622, a reservoir 624, and an accumulator 626, which can, for example, be housed on a robotic arm (e.g., robotic arm 614*a*).

The hydraulic control system can include a pressure valve 630 hydraulically coupled to the accumulator (e.g., by a hose 628) and an exhaust valve 634 hydraulically coupled to the reservoir 624 (e.g., by a hose 632). The pressure valve 630 is hydraulically coupled to an actuation piston 936 (e.g., by a hose 638), which is hydraulically coupled to the exhaust valve 634 (e.g., by a hose 640). The hoses 628, 638 and the pressure valve 630 provide a forward path to the actuation piston 636. The hoses 632, 640 and the exhaust valve 634 provide a return path to the actuation piston 636. The pressure valve 630 and the exhaust valve 634 can control the actuation piston 636 and can cause the actuation piston 936 to move, which can cause a corresponding motion of at least a portion of the hand 916*a* (e.g., a digit 618).

Each of the digits 618 of the hands 616*a*, 616*b* can have one or more actuated joints corresponding to one or more degrees of freedom (DOFs). In some examples, each hand 616*a*, 616*b* can have up to eighteen (18) DOFs. Each DOF can be driven by a respective actuation piston 636, but for clarity of illustration only one actuation piston is shown in FIG. 6A. The actuation pistons 636 associated with the DOFs of a hand can be located in the hand. In some examples, the digits 618 can include one or more position transducers operable to provide positional data that enables the robot 600 to be self-aware of a position of one or more components of the digits 618 with respect to each other, and/or to provide control of digit 618.

Example VII—Hybrid Robot

Figure 7:
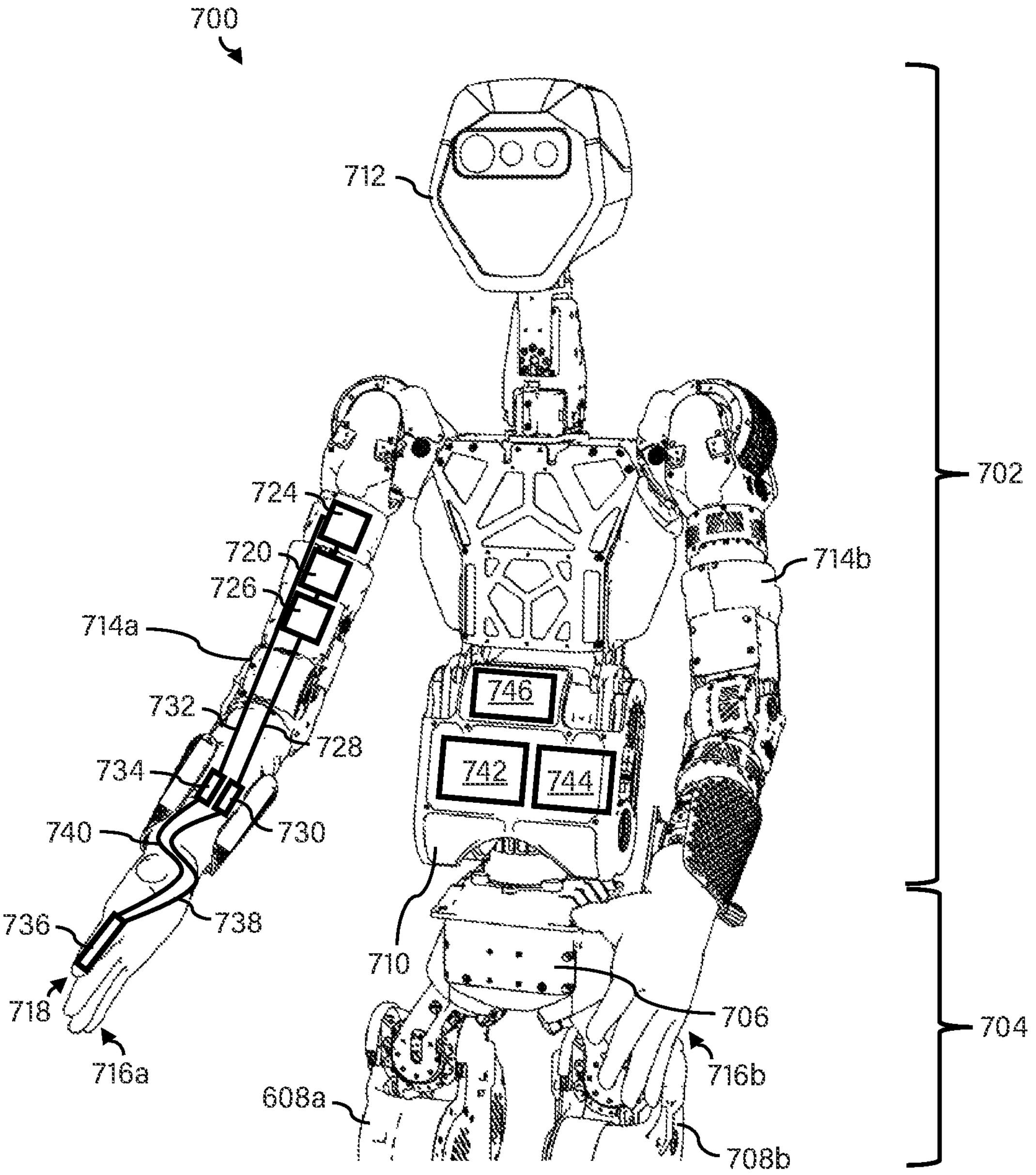
FIG. 7 is a schematic drawing of a hybrid robot.

FIG. 7 illustrates an example hybrid robot 700 having components that can be powered by hydraulics and components that can be powered by electricity or components that can be powered by a combination of hydraulics and electricity. The robot 700 can be used in a mobile robot system, such as any of the mobile robot systems described in Example IV and V.

The robot 700 includes a humanoid lower body 702 and a humanoid upper body 704. The humanoid lower body 702 includes a pelvic region 706 and two legs 708*a*, 708*b* (only the upper portions of the legs 708*a*, 708*b* are shown in FIG. 7). The upper body 704 includes a torso 710, a head 712, robotic arms 714*a*, 714*b*, and hands (or end effectors) 716*a*, 716*b*. The robotic arms 714*a*, 714*b* can be humanoid arms. In other examples, the robotic arms can have a non-humanoid form factor. The hands 716*a*, 716*b* can be humanoid hands. In other examples, the hands 716*a*, 716*b* can have a non-humanoid form factor. Each of the hands 716*a*, 716*b* can include digits 718 (e.g., fingers, thumbs, or similar structures of the hand or end effector).

The robot 700 includes a hydraulic control system having components that may be housed, for example, in the lower body 702 and/or torso 710 of the upper body 704, or located outside of the robot (e.g., on a wheeled unit that can roll with the robot as the robot moves around), or located in a fixed station to which the robot is tethered. The hydraulic control system can include a hydraulic pump 722, a reservoir 724, and an accumulator 726, which can, for example, be housed on a robotic arm (e.g., robotic arm 714*a*).

The hydraulic control system can include a pressure valve 730 hydraulically coupled to the accumulator (e.g., by a hose 728) and an exhaust valve 734 hydraulically coupled to the reservoir 724 (e.g., by a hose 732). The pressure valve 630 is hydraulically coupled to an actuation piston 736 (e.g., by a hose 738), which is hydraulically coupled to the exhaust valve 734 (e.g., by a hose 740). The hoses 728, 738 and the pressure valve 730 provide a forward path to the actuation piston 736. The hoses 732, 740 and the exhaust valve 734 provide a return path to the actuation piston 736. The pressure valve 630 and the exhaust valve 734 can control the actuation piston 736 and can cause the actuation piston 736 to move, which can cause a corresponding motion of at least a portion of the hand 716*a* (e.g., a digit 718).

Additional details about a robot with an integrated hydraulic system can be found in, for example, U.S. Provisional Patent Application Ser. No. 63/191,732, filed May 21, 2021 and entitled "Systems, Devices, and Methods for A Hydraulic Robot Arm", which is incorporated herein by reference in its entirety.

The robot 700 can include a primary electrical power source 742 (e.g., battery, supercapacitor, or fuel cell) that can be used in normal operation to power electrical and/or electronic components of the robot. Although only one primary electrical power source 742 is shown, the robot 700 can include more than one primary electrical power source. In some examples, each primary electrical power source can be dedicated to a respective designated subset of electrical or electronic components on the robot 700. In some examples, multiple primary power sources may be included to provide redundancy in the event of a failure of one primary power source.

In some examples, the robot 700 can include a secondary power source 744, which can be a power source that can be engaged by the robot 700 (or by another element of a robotic system of which the robot 700 is a part) to maintain electrical power to the electrical and/or electronic components of the robot 700 when a primary electrical power source (e.g., primary electrical power source 742) is unavailable. The primary electrical power source may be unavailable, for example, when the present electrical power source is being swapped for a replacement primary electrical power source. The secondary power source may have a lower capacity than the primary power source. The secondary power source 744 may be a secondary battery, for example.

In some examples, the robot can include a controller 746 that is powered by the primary electrical power source 746. The controller 746 can be implemented with any suitable combination of hardware, software, and/or firmware. The controller 742 may include, for example, one or more application-specific integrated circuit(s), standard integrated circuit(s), and/or computer program(s) executed by any number of computers, microcontrollers, and/or processors (including, e.g., microprocessors, central processing units). In other implementations, other suitable types of valves may be used.

In some examples, the pressure valve 730 and the exhaust valve 734 can be electrohydraulic servo valves (which can also be referred to as servo valves and servo-controlled valves) that are controlled by the controller 746. The valves 730, 734 and other components of the hydraulic system (e.g., the pump 722) can be powered by the primary electrical power source 742.

In some examples, the robot 700 can have joints that are actuated by electrical actuators, which can be powered by the primary electrical power source 742. In some examples, the robot 700 can include a hydraulic drive mechanism with a motor and drive piston that can be powered by the primary electrical power source 742. Sensors attached to the robot 700 are other examples of components that can be powered by the primary electrical power source 742.

Example VIII—Power Source Exchange Station

A mobile robot system typically includes at least one power source coupled to one or both of the robot and the mobile base in the mobile robot system. A mobile robot fleet system can include multiple robots and/or multiple mobile bases. In some examples, the mobile bases are interchangeable (e.g., at least one of the robots is able to interact with more than one of the mobile bases).

A robot of a mobile robot system can be an electric robot, a hydraulic robot, or hybrid robot (e.g., a robot that uses both hydraulic power and electric power). In some examples, the robot can be tethered to a power source without affecting the functionality of the robot (e.g., the robot can be tethered to a source of electrical power and/or hydraulic power on a mobile base). In other examples, the robot can be untethered and have an on-board power source (e.g., on-board electrical power source and/or hydraulic power source). An untethered robot may have more autonomy compared to a tethered robot.

In some examples, a robot can use an on-board electrical power source that relies on a charge or fuel that is depleted over time as a primary power source, which would require periodic replenishment of the electrical power source. It is desirable that such replenishment does not cause significant interruption of the robot's tasks. In some examples, the on-board electrical power source of a robot can be replenished by a mobile base that also functions as a charging station. In other examples, the on-board electrical power source of a robot can be replenished at a power source exchange station.

Figure 8:
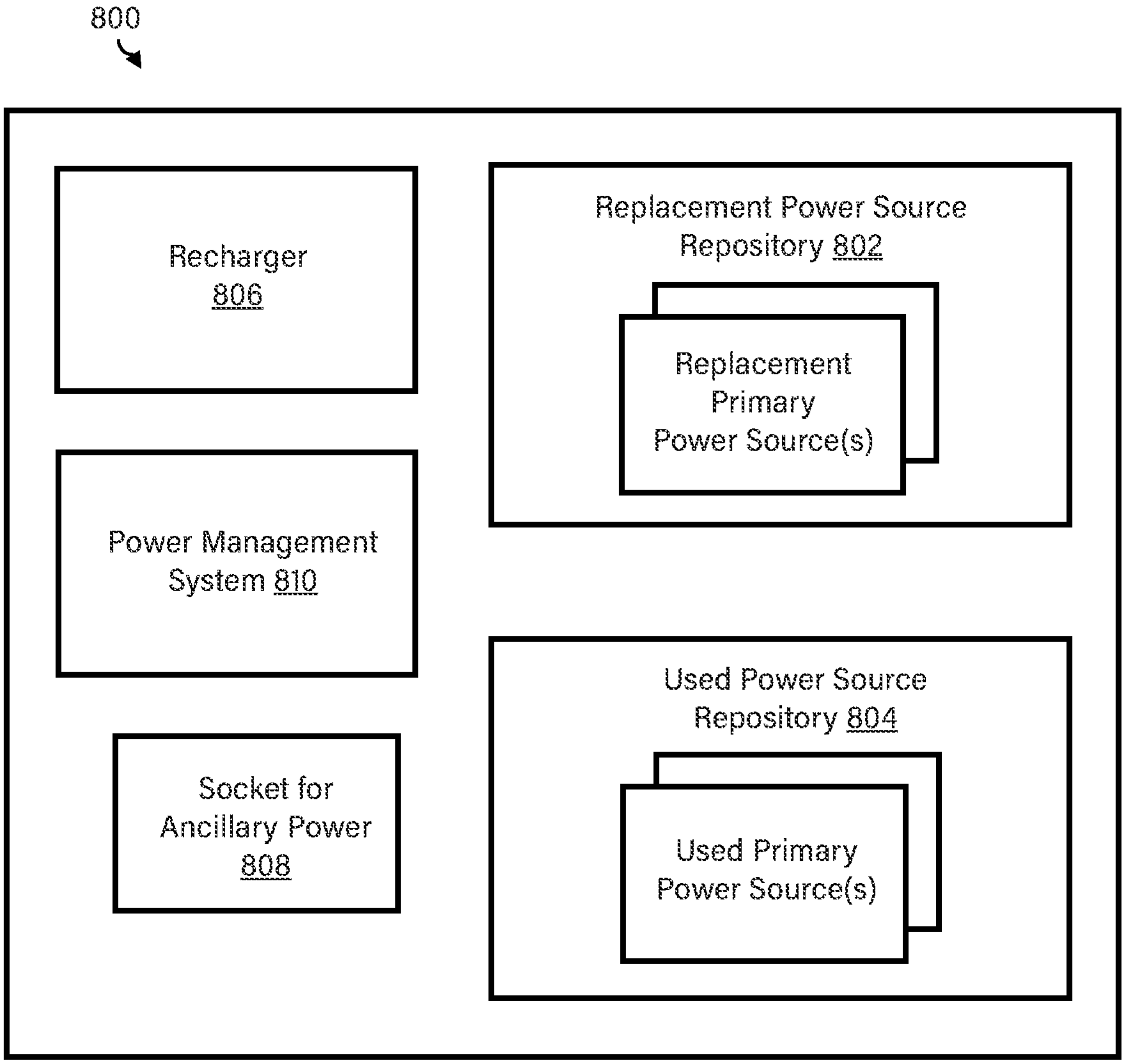
FIG. 8 is a block diagram of a power source exchange station.

FIG. 8 illustrates an example power source exchange station 800 where a member of a mobile robot system can exchange a primary electrical power source (e.g., exchange a primary electrical power source of a robot). The power source exchange station 800 can be a mobile station or a fixed station. The power source exchange station 800 includes a replacement power source repository 802, which includes one or more replacement primary electrical power sources compatible with at least one robot. The power source exchange station 800 also includes a used power source repository 804 which can include one or more used, depleted, or discharged primary electrical power sources received a robot or other member of a mobile robot system.

The power source exchange station 800 may include a recharger 806 suitable for recharging a primary electrical power source (e.g., a battery) from a mobile device. Recharging may be performed, for example, via a cabled or tethered electrical communicative coupling, or wirelessly by induction.

The power source exchange station 800 may include a socket 808 for ancillary electrical power. The socket 808 may provide DC power. The socket 808 may be used to provide secondary power to a robot while the robot is exchanging a primary power source with the power source exchange station 800. The socket 808 may be used to provide secondary power to the member of the mobile robot system (e.g., the robot) while the member of the mobile robot system is recharging (or otherwise waiting for) a primary power source.

The power source exchange station 800 may include a power management system 810. The power management system 810 may include at least one processor. In some examples (for example, when the robot is unable to identify for itself a condition of the robot's primary power source), the power management system 810 may be used to identify a low-power condition in a robot. The power management system 810 may be used to provide an automated exchange of primary power source with a robot, including engaging and disengaging a source of secondary power to maintain power to the robot during the exchange.

Example IX—Robotic Power Exchange System

Figure 9:
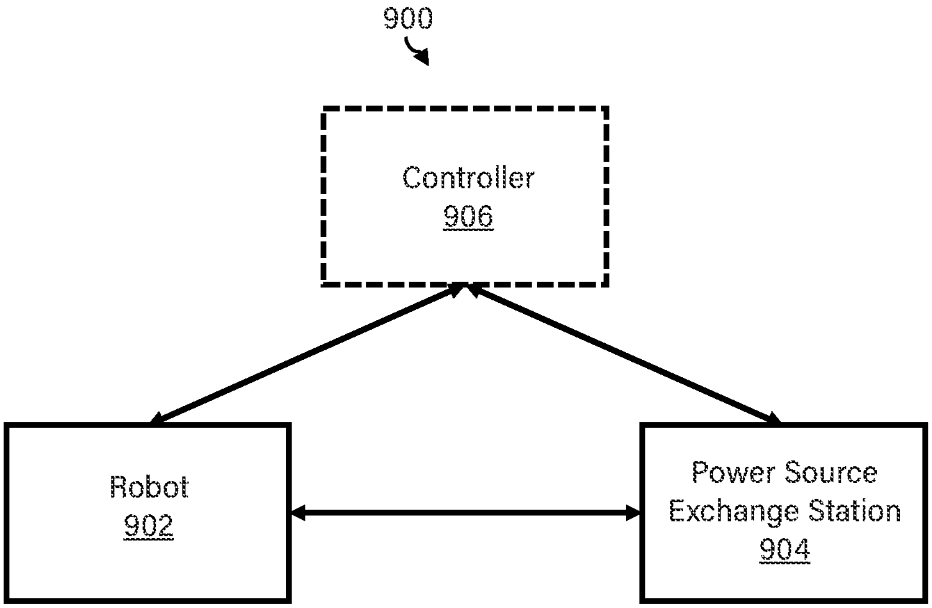
FIG. 9 is a block diagram of a robotic system including a robot and a power source exchange station.

FIG. 9 illustrates a robotic power exchange system 900 including a robot 902 and a power source exchange station 904. The robot 902 may be a general-purpose robot and can be autonomous or semi-autonomous. The robot 902 has a primary electrical power source on-board the robot. The primary electrical power source may be a battery, fuel cell, or supercapacitor, for example. The primary electrical power source may power one or more electrical or electronic components on-board the robot.

The power source exchange station 904 may be a mobile or a fixed station, the power source exchange station 904 may include a repository of one or more replacement primary electrical power sources that are compatible with the robot 902 and interchangeable with the primary electrical power source of the robot 902. The power source exchange station 904 may include a recharger. Power source exchange station 904 may include a source of fuel, for example, hydrogen or methanol for a fuel cell. Power source exchange station 904 may install a replacement fuel tank on robot 902, or may add fuel to a fuel tank already installed on robot 902.

The robotic power exchange system 900 may exchange a primary electrical power source on-board robot 902 for a replacement primary electrical power source in the repository of power source exchange station 904. Robotic system 900 may initiate this exchange when a low-power condition in the primary electrical power source on-board robot 902 is identified.

The robotic power exchange system 900 optionally includes a standalone controller 906. The controller 906 may identify a low-power condition of a primary electrical power source and/or cause an exchange of the primary electrical power source of robot 902 for a replacement primary electrical power source at power source exchange station 904.

In some examples, the technology described herein automatically swaps a discharged battery in a robot for a new or recharged battery at a power source exchange station. For example, when the robot 902 identifies a low-battery condition, the robot 902 can proceed to the power source exchange station 904. A low-battery condition may be identified by a battery management system on-board the robot, for example. A low-battery condition may be identified, for example, by monitoring a remaining capacity of the battery. In some examples, a battery system may perform a capacity test to determine whether the battery can support a desired current for a given length of time. In other examples, a low-battery condition is identified by monitoring an internal resistance of one or more cells in the battery. In some examples, a low-battery condition is inferred by analyzing a trend in a performance metric of the battery. In some examples, the robotic system anticipates the low-battery condition, and initiates an exchange before the low-battery condition is reached. While a low-battery condition is referred to herein, it will be appreciated by those of skill in the art that an equivalent condition can be identified and acted upon for other electrical power sources (e.g., fuel cells and supercapacitors).

In some examples, battery-swapping by the robot 902 and the power source exchange station 904 is performed autonomously or semi-autonomously (e.g., with little or no human intervention). In some examples, a secondary power source is engaged to provide power to the robot 902 while the battery is being swapped and power from either the battery being replaced or the replacement battery is temporarily unavailable. The secondary power source may be a secondary battery on-board the robot, for example. It may be sufficient for the secondary battery to provide about five (5) minutes of power. In some examples, the secondary battery can be recharged by the primary battery.

The secondary power source may be a DC supply via an electrical coupling between the battery-swapping station and the robot. In some examples, the robot 902 includes a socket on-board the robot to receive a tethered connection to a source of electrical power located at the power source exchange station.

Example X—Robotic Power Exchange Method

Figure 10A:
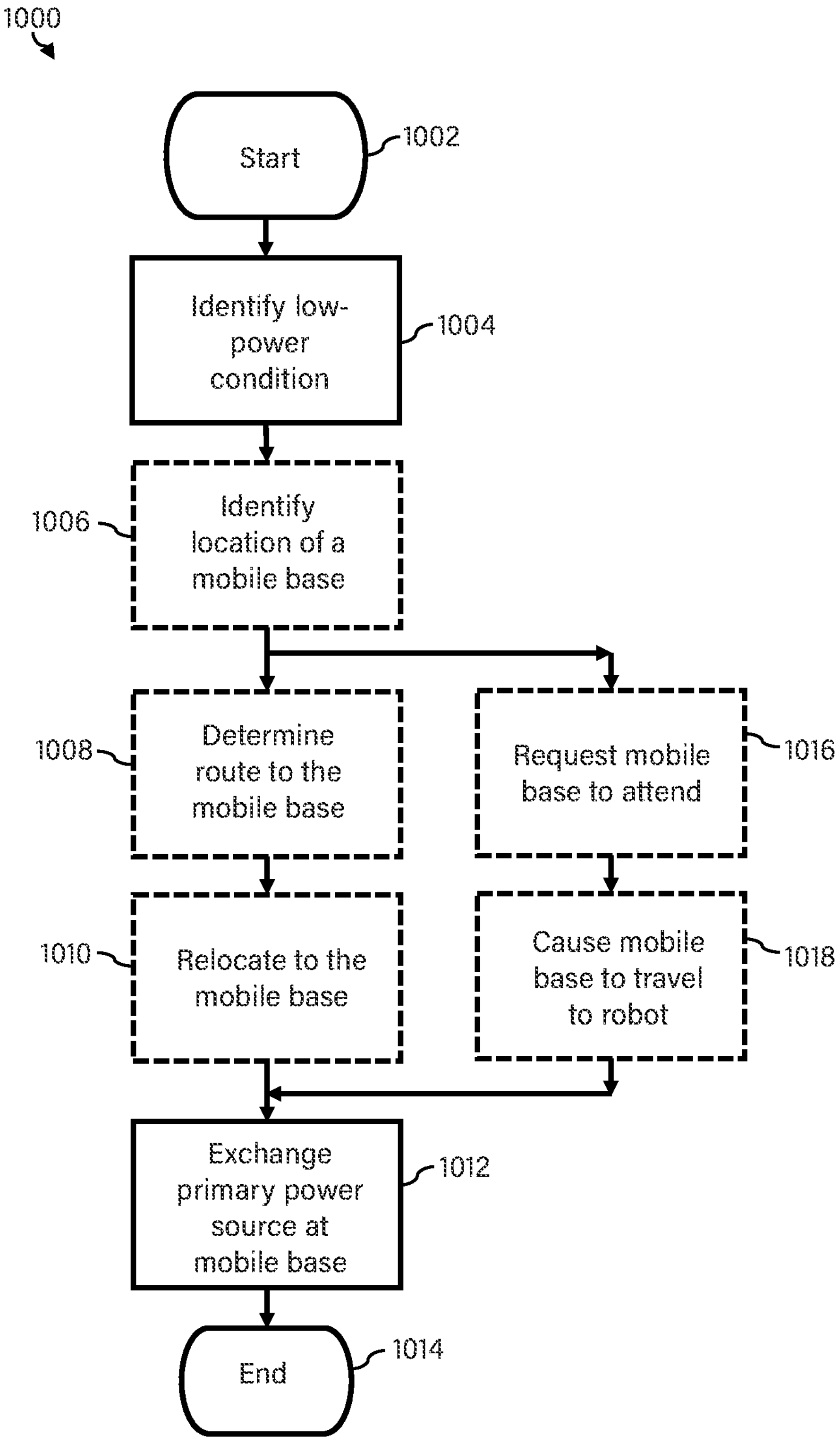
FIG. 10A is a flow chart of a method of operation of a robotic system.

FIG. 10A is a flow chart of an example method of operation 1000 of a mobile robot system. The method 1000 includes nine (9) acts 1002, 1004, 1006, 1008, 1010, 1012, 1014, 1016, and 1018, but those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 1002, in response to a starting condition (e.g., a controller powering up), the method starts. The mobile robot system includes a robot and a mobile base (which can be any of the robots and mobile bases described herein). In one example, the mobile base includes a power source exchange station.

At 1004, the mobile robot system identifies a low-power condition. In some examples, the robot identifies the low-power condition. In other implementations, the mobile base identifies the low-power condition. In yet other implementations, the low-power condition is identified by a controller separate to both the robot and the mobile base. The low-power condition indicates the robot needs to replace, recharge, or replenish its primary electrical power source. The low-power condition may be identified, for example, by monitoring an internal condition of the power source, as described in Example VII for the example of a battery.

Acts 1006, 1008, and 1010 are optional, as indicated by the dotted lines. At 1006, the mobile robot system identifies a location of the mobile base. If there are multiple mobile bases, the mobile base identified at 1006 may be the one closest to a current location of the robot body, for example. At 1008, the robotic system determines at least one route from the robot body's current location to the location of the mobile base. At 1010, the mobile robot system causes the robot body to re-locate to the location of the mobile base via one of the determined routes. In some examples, acts 1006, 1008, and 1010 are performed by at least one processor on-board the robot.

At 1012, the mobile robot system exchanges a primary electrical power source on-board the robot body for a replacement, recharged, or replenished electrical power source from the power source exchange station at the mobile base. At 1014, method 1000 ends, for example, when the robot leaves the mobile base and returns to its task.

At 1016, in some examples, the mobile robot system requests the mobile base with the power source exchange station to attend, i.e., to travel to the location of the robot body. At 1018, the mobile robot system causes the mobile base to travel to the robot.

In some examples, the mobile robot system installs an additional power source on-board the robot. This may be instead of, or in addition to, replacing a power source that has a low-power condition.

In some examples, the robot body is tethered to a primary electrical power source. For example, the robot body may be mobile, and the power source may be fixed, e.g., on the mobile base.

Figure 10B:
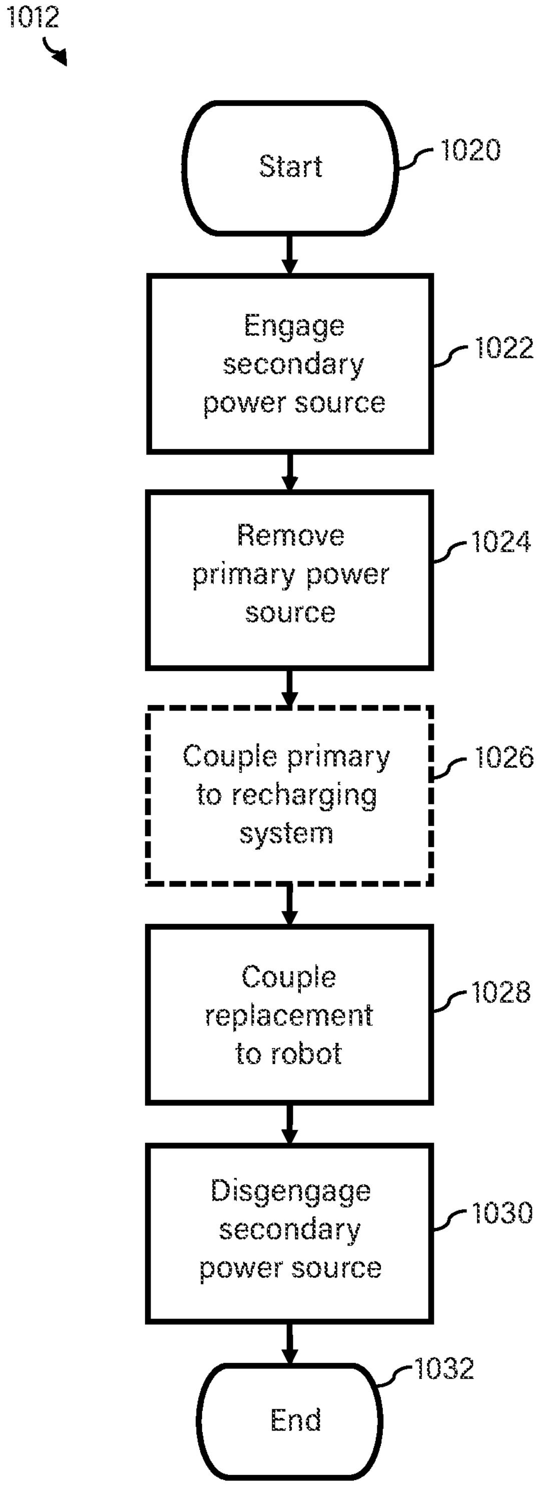
FIG. 10B is a flow chart of a method of exchanging a primary power source of a robot at a power source exchange station.

FIG. 10B is a flow chart of an example method of implementation of act 1012 of FIG. 10A for exchanging a primary power source of a robot at a power source exchange station, in accordance with the present systems, devices, and methods. Act 1012 can include seven (7) acts 1020, 1022, 1024, 1026, 1028, 1030, and 1032. Those of skill in the art will appreciate that in alternative implementations certain acts of FIG. 10B may be omitted and/or additional acts may be added. Those of skill in the art will also appreciate that the illustrated order of the acts is shown for exemplary purposes only and may change in alternative implementations.

The power source exchange station may be a mobile base of a mobile robot system comprising a robot body and the mobile base.

At 1020, in response to a starting condition (e.g., the robot body arriving at the power source exchange station), the method starts. At 1022, the mobile robot system engages a temporary secondary power source for the robot body. In some examples, the robot body switches to a secondary battery on-board the robot body. In other implementations, the robot body electrically couples to a power supply provided by the power source exchange station, for example, a DC supply from an AC/DC converter that is electrically coupled to a mains supply at the power source exchange station.

At 1024, the mobile robot system removes the robot body's primary power source. In some examples, the robot body removes its primary battery.

Optionally (as indicated by the dotted lines), at 1026, the mobile robot system electrically couples the robot body's removed primary power source to a recharging or replenishment system, and commences recharging/replenishing. For example, if the robot body's primary power source is a battery, then the mobile robot system may electrically couple the battery to a battery charger, and initiate a recharging cycle.

At 1028, the mobile robot system electrically couples a replacement primary power source to the robot body. The replacement primary power source may, for example, be a fully-charged battery compatible with the robot body. At 1030, the mobile robot system disengages the secondary power source. At 1032, the method ends, for example, when the robot body leaves the power source exchange station and returns to its task.

In some examples, the robot body is a humanoid robot having one or more hands, and able to move on legs and/or wheels. In some examples, the robot body performs the acts described with reference to FIG. 10B. These may include, for example, disconnecting and removing the primary power source, delivering it to the power source exchange station, identifying a compatible replacement primary power source at the power source exchange station, and installing the replacement primary power source in the robot body. The primary power source may be a battery, and the replacement may be a new or fully-charged battery.

In some examples, at least one element of the mobile robot system is autonomous or semi-autonomous. In some examples, the mobile robot system is a general purpose robot, and swapping the robot body's primary electrical power source is one of the robot body's functions. In some examples, where the robot is an autonomous or semi-autonomous humanoid robot, the robot includes one or more hands (i.e., humanoid end effectors, for example, hands 118*a*, 118*b* of the robot 100 of FIG. 1), and the robot can use its hands to perform acts described above with reference to FIG. 14B. The robot may, for example, use its hands to disconnect and remove the primary power source, deliver it to the power source exchange station, select a replacement, and/or install and connect the replacement.

In some examples, the power source exchange station is automated, and able to perform at least some of the acts described with reference to FIG. 10B. These may include, for example, disconnecting and removing the primary power source from the robot body, and installing a replacement primary power source in the robot.

In some examples, the robot body and the power source exchange station in the mobile base are both able to perform at least some of the acts described with reference to FIG. 10B. For example, the robot body may disconnect the primary power source, and the power source exchange station may remove and replace it by a replacement power source, before the robot body completes the reconnection of the replacement power source.

In some examples, the mobile base can be directed by a controller to a robot body that has a present or impending low-power condition, and/or can be summoned by the robot body.

Example XI—Example Mobile Robot System

Figure 11A:
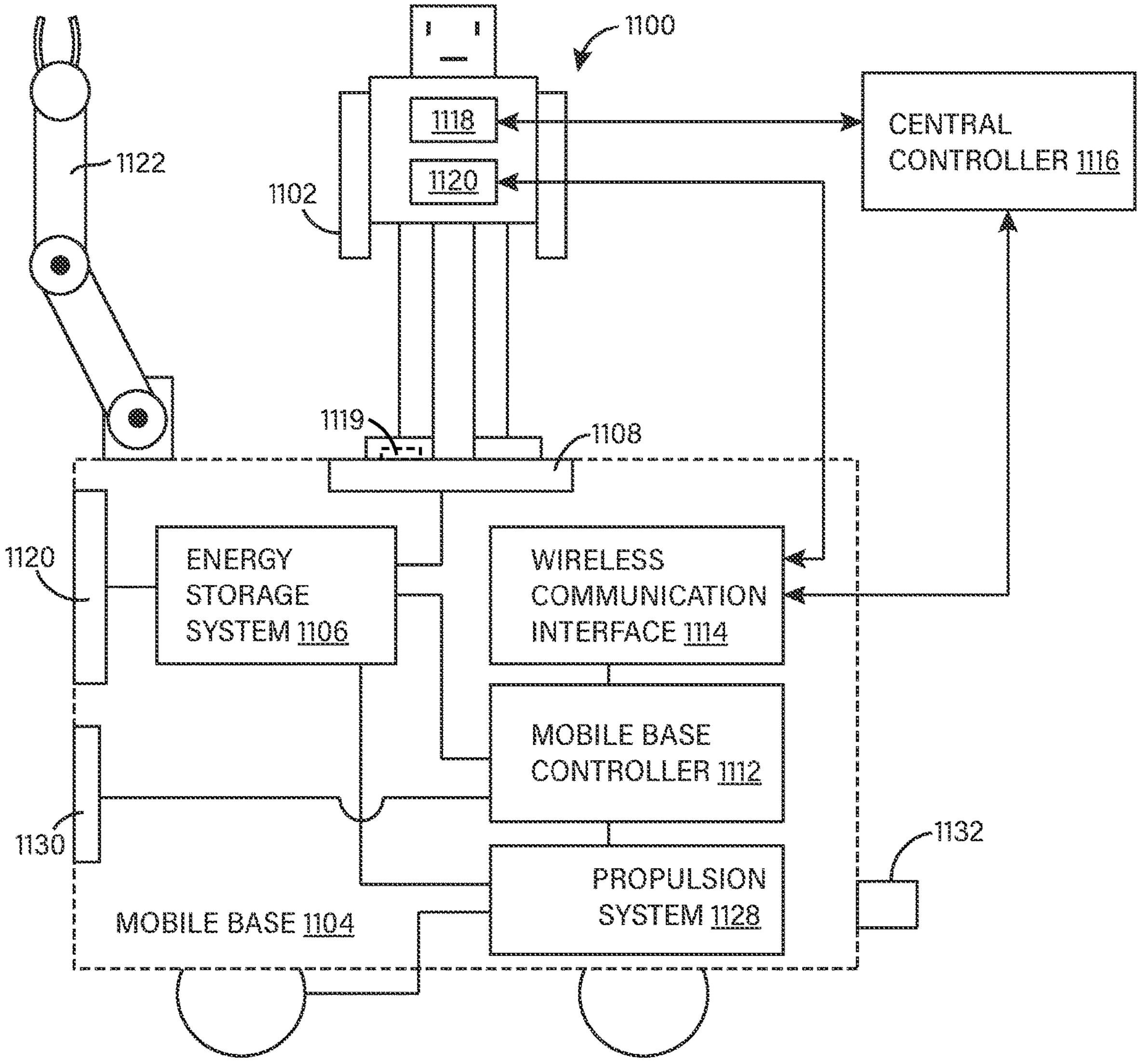
FIG. 11A is a schematic diagram of a mobile robot system.
Figure 11B:
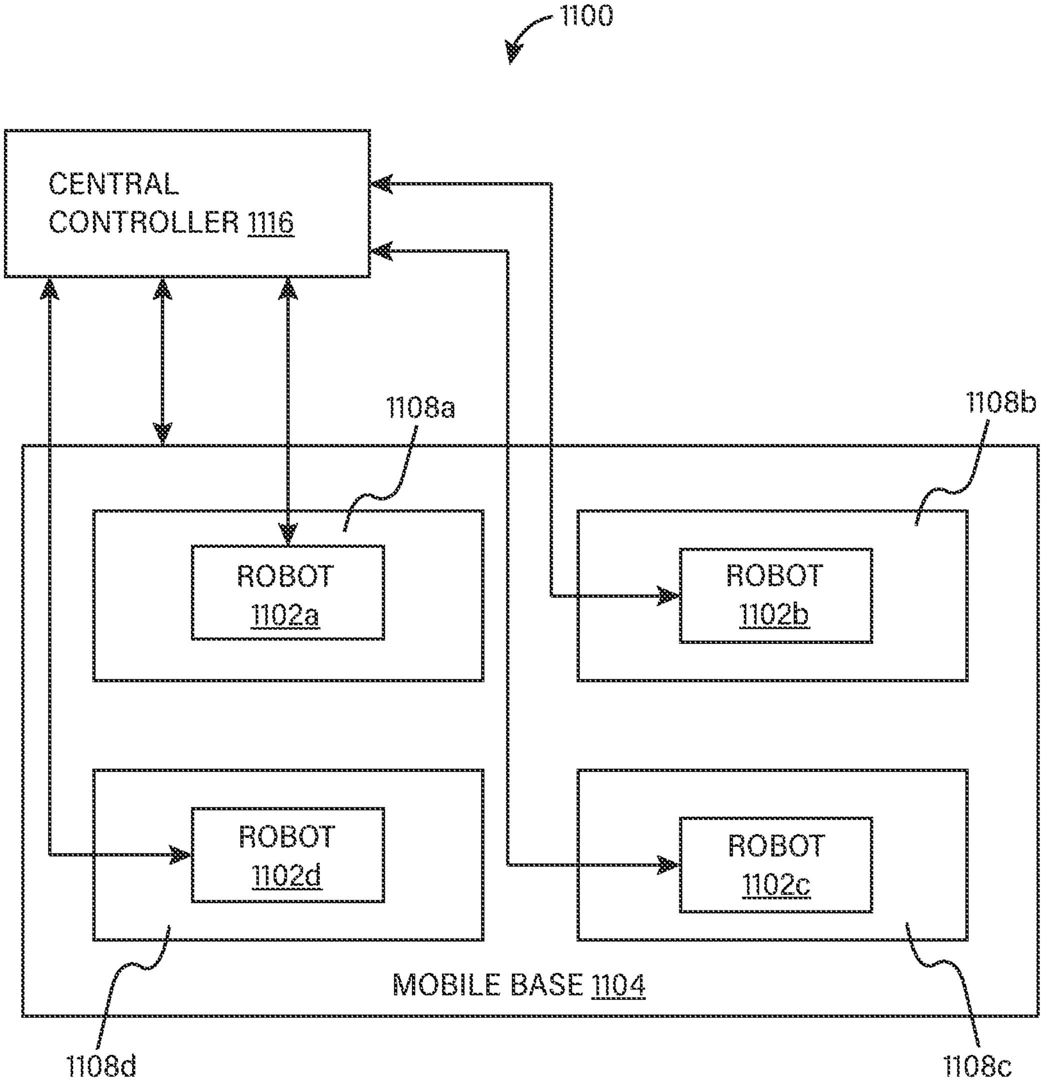
FIG. 11B is a block diagram of a mobile robot system with a mobile base having a platform to accommodate multiple robots.

FIGS. 11A and 11B illustrate an example mobile robot system 1100 including a robot 1102 and a mobile base 1104. In some examples, the robot 1102 and mobile base 1104 can communicate with a central controller 1116 (e.g., a controller of a fleet management system). For example, the robot 1102 and mobile base 1104 can transmit data to the central controller 1116 and respond to commands from the central controller 1116.

The robot 1102 can be a bipedal robot having robotic legs that can be controlled to provide the robot with locomotion. The robot 1102 can have two modes of travel: a ride mode and a walk mode. In the ride mode, the robot 1102 is supported on the mobile base 1104 (e.g., standing or sitting on the mobile base) and can navigate a space by movement of the mobile base 1104 within the space. In the walk mode, the robot 1102 is not supported on the mobile base 1104 and can navigate a space by coordinated movement of the robotic legs within the space. In the walk mode, the mobile base 1104 and the robot 1102 can navigate a space independently of each other.

In some examples, the mobile base 1104 can be autonomous or self-driving (e.g., the mobile base 1104 is capable of sensing its environment and navigating a space without human involvement or robot involvement). In some examples, the mobile base 1104 can have a semi-autonomous mode (e.g., a mode in which the mobile base 1104 navigates a space with some human involvement or robot involvement) or a manual mode (e.g., a mode in which navigation of a space is entirely controlled by a human or robot). The mobile base 1104 may operate primarily in a full autonomous mode and switch to the semi-autonomous mode or manual mode selectively. For example, if the mobile base 1104 experiences a fault while operating in a full autonomous mode, the mobile base 1104 can switch to the semi-autonomous mode or the manual mode depending on the severity of the fault.

In some examples, the robot 1102 can be autonomous (e.g., the robot 1102 is capable of sensing its environment and can operate, e.g., perform tasks and walk, without human involvement). The robot 1102 can have a high-level teleoperation mode (e.g., a mode in which the robot 1102 operates with some human involvement via teleoperation) and a low-level teleoperation mode (e.g., a mode in which the robot is entirely controlled by a human via teleoperation or operates with a degree of human involvement via teleoperation that is greater than that of the high-level teleoperation mode). The robot 1102 can operate primarily in an autonomous mode and switch to the high-level teleoperation mode or low-level teleoperation mode selectively. For example, if the robot 1102 experiences a fault while operating in the autonomous mode, the robot 1102 can switch to the high-level teleoperation mode or the low-level teleoperation mode depending on the severity of the fault.

In some examples, the mobile base 1104 can be a mobile charging station. For example, the mobile base 1104 can include an energy storage system 1106 coupled to a mobile base charging interface 1108. The energy storage system 1106 can include one or more rechargeable storage devices (e.g., batteries or supercapacitors). In some examples, the robot 1102 can include a rechargeable power source 1118 coupled to a robot charging interface 1119. In some examples, the robot 1102 can be charged by the mobile base 1104 when the robot 1102 is in the ride mode on the mobile base 1104. The power transfer between the mobile base 1104 and the robot 1102 can occur via wired coupling or inductive coupling between the charging interfaces 1108, 1119.

In the example illustrated in FIG. 11A, the mobile base 1104 is configured to accommodate a single robot 1102. In other examples, such as illustrated in FIG. 11B, the mobile base 1104 can be configured to accommodate multiple robots (e.g., robots in a fleet of robots). In some examples where the mobile base 1104 can accommodate multiple robots (e.g., robots 1102*a-d*), the mobile base 1104 can be configured as a mobile charging station for multiple robots. For example, the mobile base 1104 can include multiple charging interfaces 1108*a-d* coupled to the energy storage system 1106).

In some examples, the mobile base 1104 can be equipped with a mobile base controller 1112 that can control operations of the mobile base 1104. For example, the mobile base controller 1112 can include at least one processor and memory for processing processor-readable instructions and data. In some examples, the mobile base 1104 can be equipped with a wireless communication interface 1114 that can allow the mobile base 1104 to communicate with other systems (e.g., the robot 1102 or the central controller 1116 or another mobile base).

In some examples, the robot 1102 can be equipped with a robot controller 1118 that can control operations of the robot 1102. For example, the robot controller 1118 can include at least one processor and memory for processing processor-readable instructions and data. In some examples, the robot 1102 can be equipped with a wireless communication interface 1120 that can allow the robot 1102 to communicate with other systems (e.g., the mobile base 1104 or the central controller 1116 or another robot).

In some examples, the mobile base 1104 can include a second charging interface 1120 coupled to the energy storage system 1106. In some examples, the energy storage system 1106 can be charged through the second charging interface 1120. The second charging interface can be a wired or wireless charging interface. The mobile base controller 1112 can monitor usage of the energy storage system and detect when the mobile base 1104 needs to be recharged.

In some examples, the mobile base 1104 can be a wheeled base having wheels 1124, 1126. In some examples, the mobile base 1104 can include a propulsion system 1128 that can drive the wheels 1124 and/or 1126. In some examples, the propulsion system 1128 can draw power from the energy storage system 1106 in some examples.

In some examples, the mobile base 1104 can be a non-humanoid robot. For example, the mobile base 1104 can include one or more robotic tools 1122 (e.g., a robotic arm with an end effector) that can be used to perform tasks.

In some examples, the mobile base 1104 can include sensors 1130 (e.g., image sensors, touch sensors, GPS sensors, etc.) that enable the mobile base 1104 to navigate a space safely.

In some examples, the mobile base 1104 can include a hitch system 1132 that allows the mobile base 1104 to be connected to a load (e.g., a trailer) and operated to pull the load.

The mobile base 1104 can have any combination of the features described for mobile bases in Examples Ill-IX.

Example XII—Robotic Power System

Figure 12:
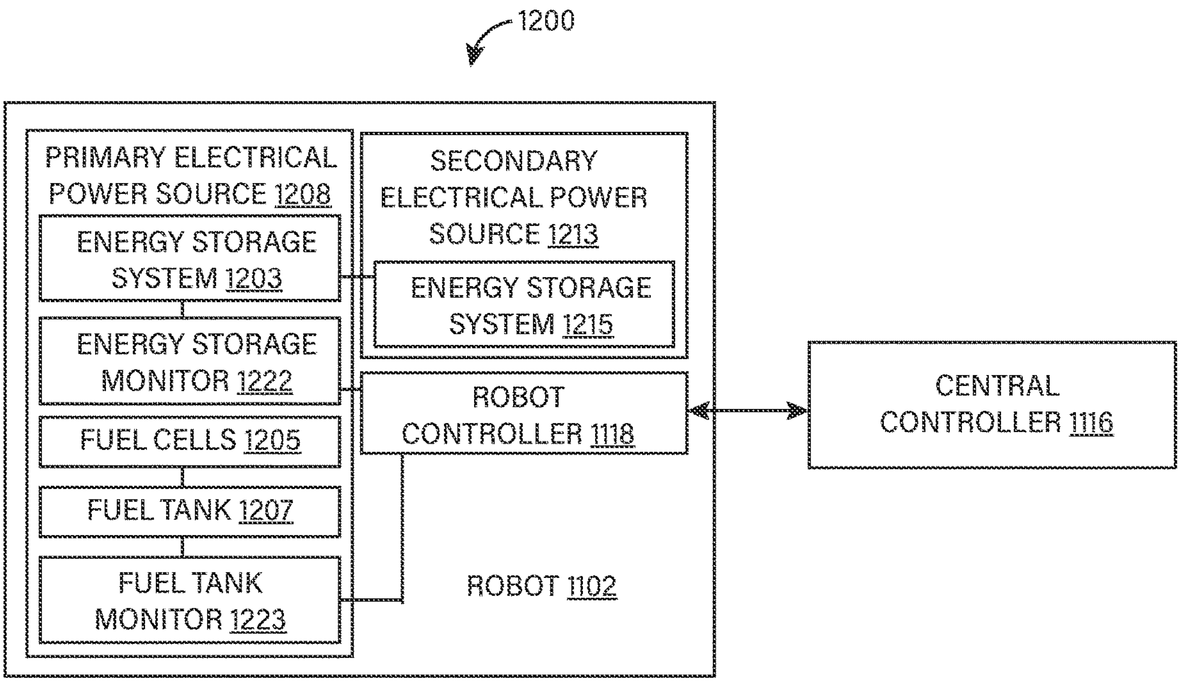
FIG. 12 is a block diagram of a robot system.

FIG. 12 is a block diagram illustrating an example power system 1200 for the robot 1102 (see Example XI). The power system 1200 can include a primary electrical power source 1208 on-board the robot 1102 (e.g., attached to the robot). The primary electrical power source 1208 can be used to power one or more electrical or electronic components on-board the robot 1102.

In some examples, the primary electrical power source 1208 can include an energy storage system 1203 having rechargeable storage devices (e.g., batteries or supercapacitors). In some examples, the primary electrical power source 1208 can include an energy storage monitor 1222 that monitors the performance of the energy storage system 1203. For example, the energy storage monitor 1222 may periodically perform capacity tests to determine if the storage devices of the energy storage system 1203 can support a desired current for a given length of time and/or the energy storage monitor 1222 may monitor an internal resistance of one or more storage cells in the storage devices. In some examples, a low-power condition of the robot 1102 can be identified based on data from the energy storage monitor 1222. The low-power condition can indicate that the energy storage system 1203 should be replenished (e.g., recharged or replaced).

In some examples, the primary electrical power source 1208 can include an alternate energy source. For example the primary electrical power source 1208 can include one or more fuel cells 1205 that can generate electrical energy using fuel (e.g., hydrogen or methanol) from a fuel tank 1207. The electrical energy generated by the fuel cell 1205 can be stored in an energy storage system (e.g., the energy storage system 1203) or used directly by one or more electrical components of the robot 1602. In some examples, the primary electrical power source 1208 can include a fuel tank monitor 1223 that monitors the volume of fuel in the fuel tank 1207. In some examples, a low-power condition of the robot 1102 can be identified based on data from the fuel tank monitor 1223. The low-power condition can indicate that the fuel tank 1207 should be replenished (e.g., replaced or refilled).

In some examples, the robot controller 1118 of the robot 1102 can be communicatively coupled to the energy storage monitor 1222. If the primary electrical power source 1208 uses fuel cells 1205, the robot controller 1118 can be communicatively coupled to the fuel tank monitor 1223. In some examples, the robot controller 1118 can initiate a power charging operation for the robot 1102 based on data received from the monitors 1222, 1223. For example, the robot controller 1118 can identify a low-power condition from the data received from the monitors 1222, 1223 (e.g., by analyzing trends in the data or detecting that the energy storage system capacity or fuel capacity is below a particular threshold) and initiate the power charging operation based on the low-power condition.

In some examples, the robot controller 1118 can transmit the data received from the monitors 1222, 1223 to the central controller 1116, which can, in some examples, identify a low-power condition of the robot 1102 from the data and initiate the power charging operation for the robot 1102. In other examples, the robot central controller 1116 can initiate the power charging operation based on a low-power condition alert from the robot controller 1118.

In some examples, a power charging operation for the robot 1102 can involve docking the robot 1102 at the mobile base 1104 for charging. In other examples, the power charging operation can involve the robot 1102 walking to or riding on the mobile base 1104 to a power source exchange station for charging. The term "charging" is used herein to mean any form of replenishing the energy source(s) in the robot 1102.

In some examples, the robot 1102 can include a secondary electrical power source 1213 that can power one or more electrical or electronic components on-board the robot 1102. The secondary electrical power source 1213 can be used as a backup power source when the primary electrical power source 1208 is unavailable for use (e.g., when the primary electrical power source 1208 is involved in a power charging operation or when the robot has a low-power condition). The secondary electrical power source 1213 can, for example, include an energy storage system 1215 having rechargeable storage devices (e.g., batteries or supercapacitors). In some examples, the primary electrical power source 1208 can replenish the storage devices in the energy storage system 1215 after the secondary electrical power source 1213 has been used to power the robot 1102.

Example XIII—Robotic Power Source Charging System

Figure 13:
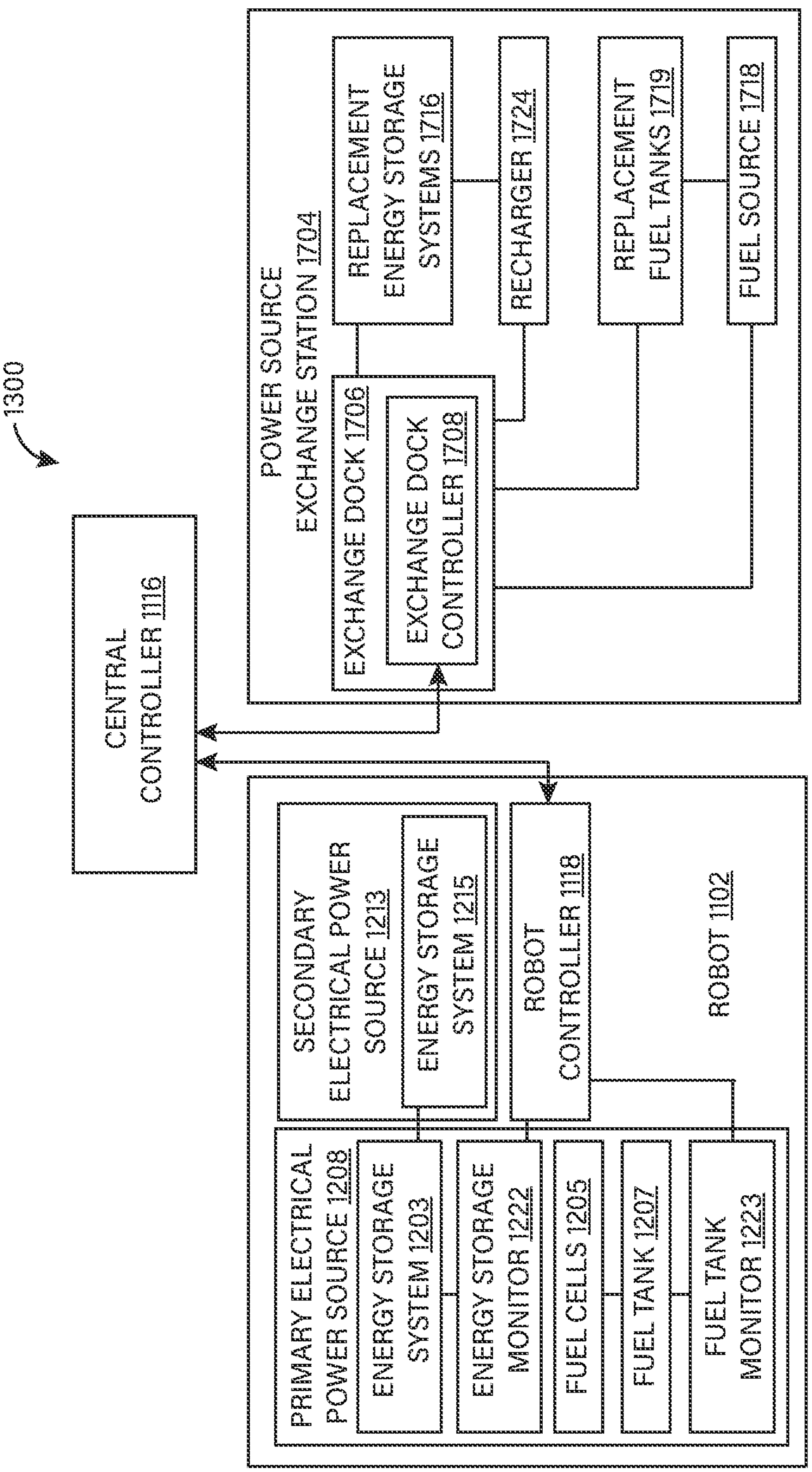
FIG. 13 is a block diagram of a system including a robot system and a power source exchange station in communication with a central controller.

FIG. 13 is a block diagram of an example robot power source charging system 1300 including the robot 1102 and a power source exchange station 1304. The power source exchange station 1304 can be a mobile station that can travel to a location of the robot 1102 when a low-power condition of the robot 1102 is identified or can be a fixed station that the robot 1102 can travel to either by walking or by transportation on a mobile base (e.g., the mobile base 1104 in Example VII).

The power source exchange station 1304 can include an exchange dock 1306 where power source components (e.g., energy storage system or fuel tank) from the robot 1102 can be received. The exchange dock 1306 can include or communicate with an exchange dock controller 1308 that manages operations of the power source exchange station 1604. In some examples, the exchange dock controller 1308 can communicate with the central controller 1116.

The power source exchange station 1304 can include a repository of one or more replacement energy storage systems 1316 that are compatible and interchangeable with the primary energy storage system 1203 of the robot 1602. The power source exchange station 1304 can include a recharger 1324 that can recharge an energy source system received at the exchange dock 1306. The recharger 1324 can be connected to any suitable energy source. After an energy source system has been recharged at the recharger 1324, the recharged energy source system can be added to the repository of energy storage systems 1316 for later use by a robot.

In some examples, such as when the robot 1102 uses one or more fuel cells 1205, the power source exchange station 1304 can include a fuel source 1318 (e.g., a source of hydrogen or methanol) from which the fuel tank 1207 on the robot 1602 can be refilled. In other examples, the power source exchange station 1304 can include a repository of one or more replacement fuel tanks 1319 containing fuel that is compatible with the fuel cells 1205 of the primary electrical power source 1208 of the robot 1602 (i.e., in cases where the robot 1102 uses fuel cells). In some examples, instead of refilling the fuel tank 1207 during the power source exchange operation, the fuel tank 1207 on the robot 1102 can be exchanged for one of the replacement fuel tanks 1319. In some examples, a fuel tank 1207 returned to the power source exchange station 1304 by a robot can be refilled from the fuel source 1318 and then added to the repository of replacement fuel tanks 1319.

In some examples, the robot controller 1118 and the exchange dock controller 1725 can communicate with the central controller 1116. In some examples, the central controller 1116 can identify a low-power condition of the primary electrical source 1208 or receive alerts about low-power condition of the primary electrical source 1208 and initiate a power charging operation for the robot 1602 at the power source exchange station 1304. For example, while the robot 1102 is operating, the robot controller 1118 can transmit the data received from the monitors 1222, 1223 to the central controller 1116, which can then initiate a power charging operation at the power source exchange station 1304 if the data indicates that the robot is in a low-power condition.

In response to identifying a low-power condition of the robot 1602, the mobile robot system controller 1606 can initiate a power charging operation. The actions performed during the power charging operation can depend on the configuration of the primary electrical power source 1208 or the source of the low-power condition of the robot 1602. For example, if the low-power condition is due to the state of charge of the energy storage system 1203 being low, the power charging operation can involve exchanging the energy storage system 1203 for a replacement energy storage system with a higher state of charge at the power source exchange station 1304. If the low-power condition is due to the volume of the fuel in the fuel tank 1207 being low, the power charging operation can include refilling the fuel tank 1207 or exchanging the fuel tank 1207 for a replacement fuel tank with a higher fuel volume at the power source exchange station 1304.

The power charging operation can be performed autonomously (e.g., without human involvement) or semi-autonomously (e.g., with some human involvement). In the autonomous scenario, the exchange dock 1306 can include mechanisms and controls to unload the energy storage system 1203 or the fuel tank 1207 from the robot 1102, select replacement energy storage system 1316 or replacement fuel tank 1319 from the appropriate repositories of the power source exchange station 1304, and load the replacement energy storage system 1316 or replacement fuel tank 1319 on the robot 1102. In examples where the fuel tank 1207 is refillable, the power source exchange station 1304 can include mechanisms to refill the fuel tank 1207 and load the refilled fuel tank 1207 onto the robot 1102 (e.g., instead of replacing the fuel tank 1207).

During a power charging operation, the secondary electrical power source 1213 on-board the robot 1102 can be engaged to provide power to one or more electrical components of the robot 1102. In other examples, the robot 1102 can be connected to an external power source (e.g., a DC supply) during the power charging operation, and the external power source can power one or more electrical components of the robot 1102 during the operation. In some examples, the secondary electrical power source 1213 can be charged at the power source exchange station 1304 while performing the power charging operation for the robot 1102. In other examples, after the power charging operation has been completed, the secondary electrical power source 1213 can be recharged from the recharged primary electrical storage system on-board the robot 1102.

Example XIV—Mobile Robot Fleet System

Figure 14:
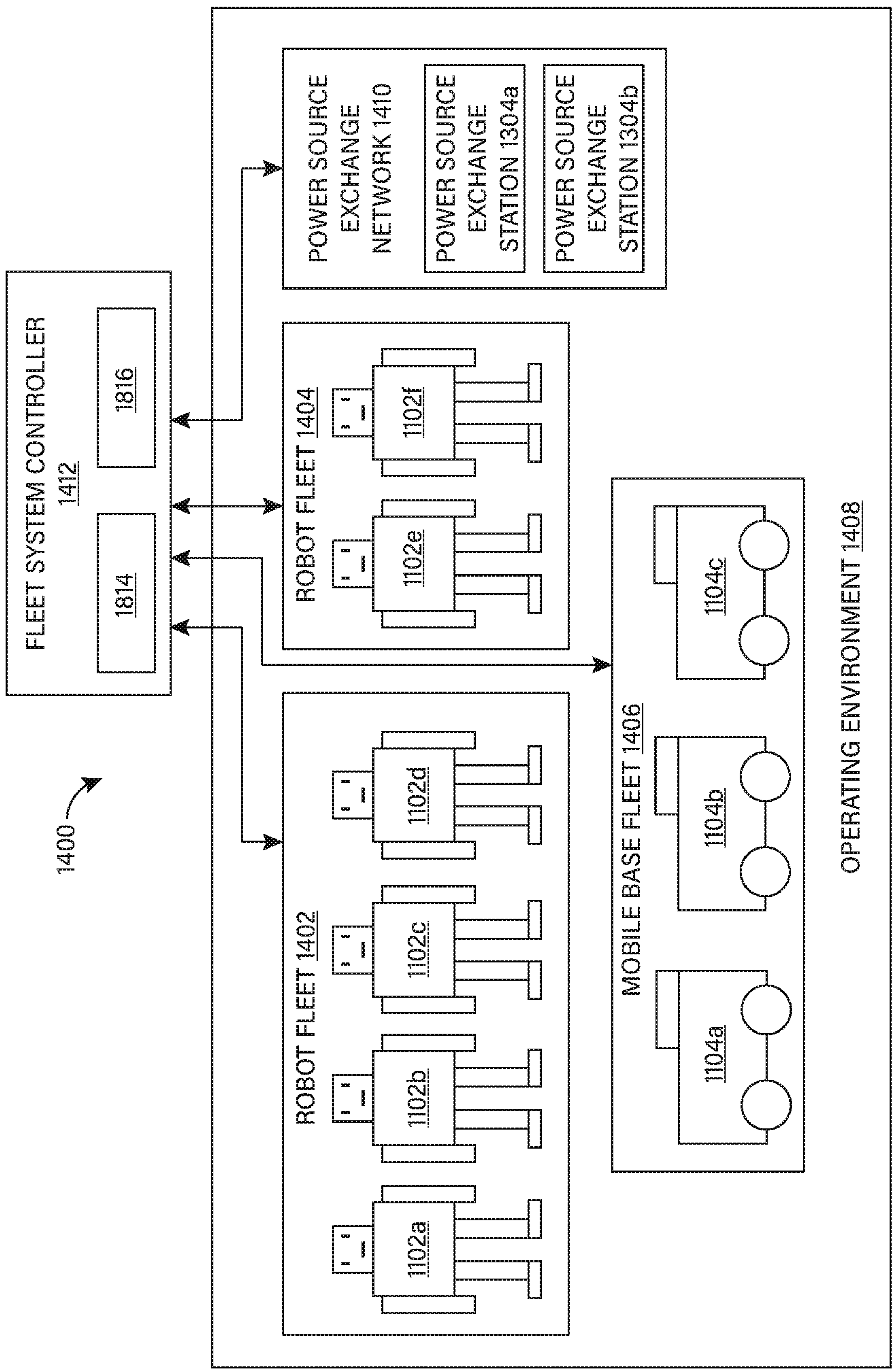
FIG. 14 is a block diagram of a robot fleet system.

FIG. 14 illustrates an example fleet system 1400 including one or more robot fleets (e.g., robot fleets 1402, 1404) and one or more mobile base fleets (e.g., mobile base fleet 1406) that can operate within an operation environment 1408 (e.g., a manufacturing facility, a warehouse, a retail space, a hospitality facility, etc.). Each robot in a robot fleet can pair with a mobile base in a mobile base fleet to form a mobile robot system as described in Example VII.

Each of the robot fleets 1402, 1404 can have any number of robots. For example, the robot fleet 1402 can include robots 1102*a*, 1102*b*, 1102*c*, and 1102*d*, and the robot fleet 1404 can include robots 1102*e* and 1102*f*. The robots 1102*a-f* can have any combination of the properties described for the robot 1102 in Examples VII-IX.

The mobile base fleet 1406 can have any number of mobile bases. For example, the mobile base fleet 1406 can have mobile bases 1104*a*, 1104*b*, and 1104*c*. The mobile bases 1104*a-c* can have any combination of the properties described for the mobile base 1104 in Examples XI-XIII.

The number of mobile bases in the fleet system 1400 can be the same as the number of robots in the fleet system or can be fewer than the number of robots in the fleet system. In some examples, one mobile base can support more than one robot at the same time (e.g., a mobile base can be a multi-platform or multi-seat robot as described in Example VII). In general, the fleet system 1400 should have a sufficient number of mobile bases to support operation of the robots in the system.

In some examples, robots in multiple robot fleets (e.g., robot fleets 1402, 1404) can share mobile bases in one mobile base fleet (e.g., mobile base 1406). In other examples, each robot fleet or one of multiple robot fleets can have a dedicated mobile base fleet. For example, in one case, the robots in the robot fleet 1402 may have different mobile base requirements compared to the robots in the robot fleet 1404. In this case, two mobile base fleets can be configured to satisfy the different mobile base requirements of the robot fleets 1402, 1404.

In some examples, the fleet system 1400 can include a power source exchange network 1410 having one or more power source exchange stations (e.g., power source exchange stations 1304*a*, 1304*b*). The power source exchange stations can have any combination of the properties described for the power source exchange station 1304 in Example IV. The power source exchange stations in the power source exchange network 1410 can be located in the same general area of the operation environment 1408 or can be strategically distributed across the operation environment 1408 (e.g., positioned close to locations where the robots perform certain tasks).

The fleet system 1400 can include a fleet system controller 1412 that can communicate with the robots in the robot fleets 1402, 1404, with the mobile bases in the mobile base fleet 1406, and with the power source exchange station 1410. The fleet system controller 1412 can include one or more processors and one or more non-transitory processor-readable media. The fleet system controller 1412 can include a wireless communication interface for communication with the various fleets. The fleet system controller 1412 can be a single controller or a network of controllers. The fleet system controller 1412 may be located within the operation environment 1408 or may be remote to the operation environment 1408. In some examples, fleet system controller 1412 can be integrated with or communicate with the central controller 1116.

The fleet system controller 1412 may include one or more task lists (e.g., task lists 1814, 1816) including different tasks to be assigned to a number of robots. In some cases, a collection of tasks may constitute a job. The fleet system controller 1412 can coordinate task assignments for multiple fleets of robots (e.g., robot fleets 1402, 1404). In some examples, each of the robots in the robot fleets 1402, 1404 can have electrical components (e.g., actuators and controller) that are powered by an on-board primary electrical power source. In some examples, the fleet system controller 1412 can allocate tasks to the robots based on the current power capacity of the primary electrical power sources of the robots.

In one example, the fleet system controller 1412 can receive power capacity data for each given robot 1102*x*, for example, from the robot controller of the robot. The fleet system controller 1412 can use the power capacity data to determine the current capacity of the given robot 1102*x*. In another example, the fleet system controller 1412 can estimate a current power capacity of a given robot based on the number of tasks allocated and the corresponding power usage of actuators of the robot involved in performing the task. Based on the current capacity of the given robot 1102*x*, the fleet system controller 1412 can determine if the given robot 1102*x* has a low-power condition (e.g., the stored energy in the primary electrical power source is below a threshold or a resource in the primary electrical power source used to generate electrical power is low).

If the fleet system controller 1412 determines that the given robot has a low-power condition, the fleet system controller 1412 can generate a power charging job for the given robot. The power charging job can include one or more tasks. For example, the power charging job can include a task for the given robot to get itself recharged. The power source exchange job can include a task for a target power source exchange station to charge the given robot and/or a task for a mobile base to charge the given robot or transport the given robot to the location of the target power source exchange station for charging. The fleet system controller 1412 can initiate execution of the power charging job by assigning the associated tasks.

Example XV—Mobile Robot Operation Method

Figure 15:
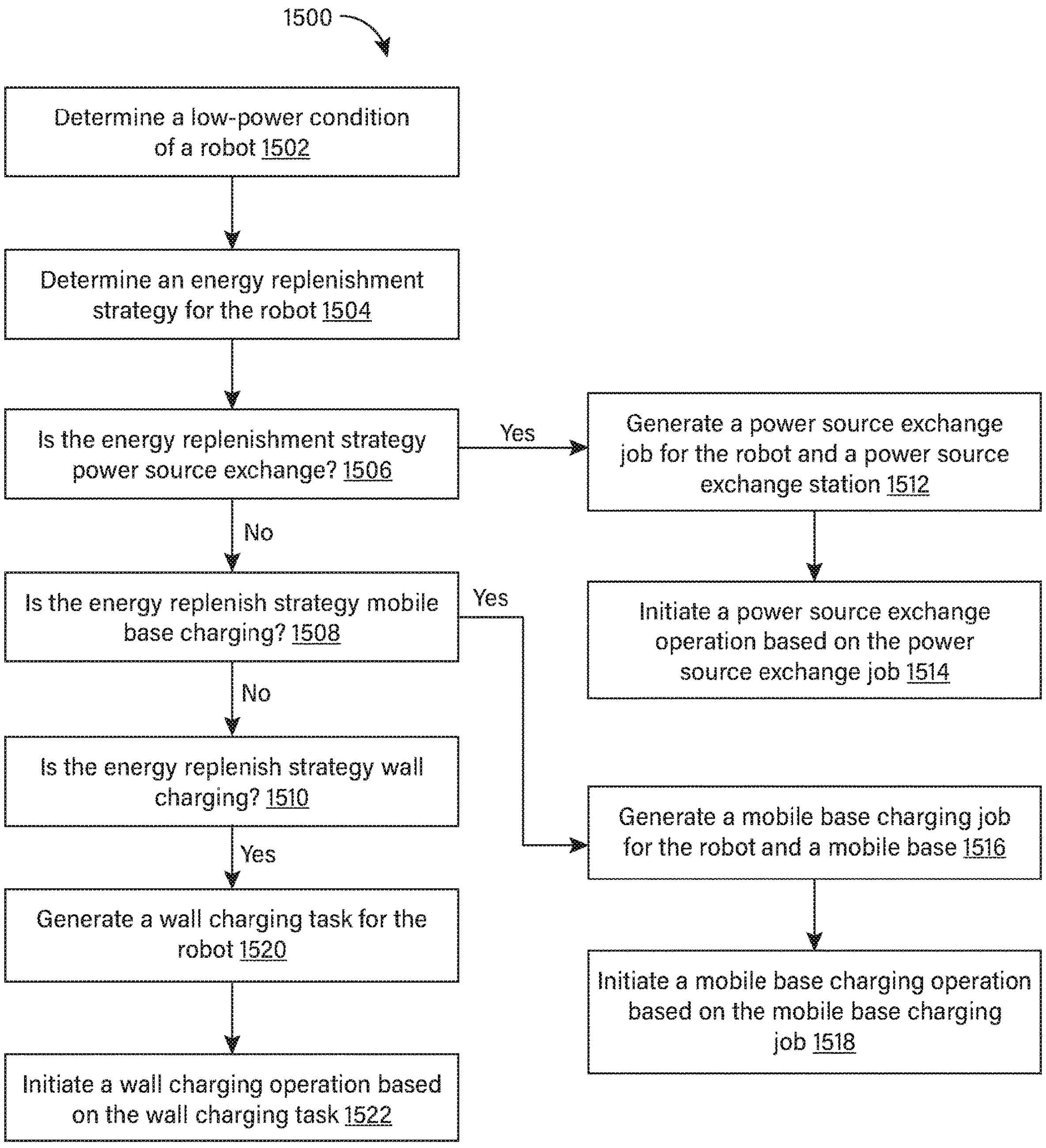
FIG. 15 is a flow diagram of a method of energy replenishment for a robot.

FIG. 15 is a flow chart illustrating an example method 1500 of operating a mobile robotic system. The method 1500 can be performed with the systems described in Examples XI-XV. Operations are illustrated in a particular order in FIG. 15. However, the operations may be reordered and/or repeated as desired and appropriate (e.g., some operations illustrated as performed sequentially may be performed in parallel).

At 1502, the method can include a detecting a low-power condition of a given robot. A low-power condition can be a condition of the robot indicating that an energy storage level (e.g., charge level or fuel level) in the primary electrical power source of the robot is below a certain threshold. In some examples, the robot can be a member of a managed fleet of robots. In some examples, the central controller and/or fleet system controller can detect the low-power condition of the robot.

In one example, the method of detecting the low-power condition of the robot can include the robot self-identifying that it has a low-power condition. For example, the controller of the robot can receive energy source monitoring data from an energy storage monitor and/or a fuel tank monitor of the primary electrical power source and infer from the energy source monitoring data that the robot has a low-power condition. In some examples, the robot can transmit the low-power condition to the central controller and/or fleet system controller.

In another example, the method of detecting the low-power condition can include a mobile base identifying a low-power condition of the robot. For example, the controller of the mobile base can receive energy source monitoring data from the controller of the robot while the robot is riding on the mobile base and infer from the energy source monitoring data that the robot has a low-power condition. In some examples, the mobile base can transmit the low-power condition with the identity of the robot to the central controller and/or fleet system controller.

In another example, the central controller and/or fleet system controller can identify that the robot has a low-power condition. For example, the central controller and/or fleet system controller can receive energy source monitoring data from the robot and infer from the energy source monitoring data that the robot has a low-power condition.

At 1504, the method can include determining an energy replenishment strategy for the robot. In some examples, the energy replenishment strategy can be determined by the central controller and/or fleet system controller. In some examples, the energy replenishment strategy can be mobile base charging or power source exchange or wall charging. The energy replenishment strategy can be determined based on one or more factors, such as whether the robot is currently performing a task and if the robot has sufficient power to complete the task, whether mobile base charging is available (e.g., whether a mobile base fleet includes a mobile base that can charge the primary electrical power source of the robot), whether power source exchange is available (e.g., whether a power source exchange network includes a power source exchange station that can charge or replace the primary electrical power source of the robot), or whether plug-in charging is available (e.g., whether there is a nearby outlet that the robot can plug itself into).

The energy replenishment strategies can have assigned priorities. For example, the power source exchange is relatively fast can be assigned a high priority level, mobile base charging can allow the robot to perform tasks while being charged but may not necessarily be as fast as power source exchange and can be assigned a medium priority level, and wall charging can be a low priority level. If multiple replenishment strategies are available for the robot, the priority levels can be used to select an appropriate one of the multiple replenishment strategies (e.g., the strategy with the highest priority level can be selected). If the method determines at 1506 that the energy replenishment strategy is power source exchange, the method continues at 1512 to use power source exchange. If the method determines at 1508 that the energy replenishment strategy is mobile base charging, the method continues at 1516 to use mobile base charging. If the method determines at 1510 that the energy replenishment strategy is wall charging, the method continues at 1520.

At 1512, the method includes generating a power source exchange job for the robot and a selected power source exchange station. In some examples, the central controller and/or fleet system controller can generate the power source exchange job.

The method can include identifying power source exchange stations from a network of power source exchange stations that can perform a power source exchange operation for the robot. If there are multiple power source exchange stations that can perform the power source exchange operation, the method can select one of the power source exchange stations based on criteria such as availability of the power source exchange station to perform the power source exchange operation within a given timeframe and proximity of the power source exchange station to the robot. To enable the method to select the appropriate power source exchange station, the method can include receiving real-time updates from the power source exchange stations about the jobs on the job stack of the power source exchange stations. For example, the exchange dock controllers in the power source exchange stations can transmit real-time updates to the central controller and/or fleet system controller.

The method can include determining a suitable location for the power source exchange operation to occur based on the location of the selected power source exchange station and the location of the robot. For example, if the selected power source exchange station is a fixed station, then the suitable location for the power source exchange operation is the location of the selected power source exchange station. If the power source exchange station is a mobile station, then the suitable location for the power source exchange station can be the current location of the robot or somewhere between the current location of the robot and the current location of the selected power source exchange station.

The method can include determining the travel mode of the robot to the location of the power source exchange operation. If the robot is in walk mode, the method can determine if the robot requires transportation to the location of the power source exchange operation. For example, if the selected power source exchange station is a fixed station and the robot is in a walk mode, the method can determine whether the robot has sufficient energy capacity to walk to the location of the power source exchange operation. If the robot does not have sufficient energy capacity to walk to the location of the power source exchange operation, the method can determine that the robot will need a mobile base to ride to the location of the power source exchange operation.

The power source exchange job can include a robot service task for the selected power source exchange station and an energy replenishment task for the robot. The robot service task can specify an identifier of the robot and a location of the power source exchange operation. The energy replenishment task can specify an identifier of the power source exchange station, a location of the power source exchange operation, and an expected travel mode of the robot to the location of the power source exchange operation.

At 1514, the method can include initiating a power source exchange operation based on the power source exchange job. The method can initiate the power source exchange operation by assigning the robot service task in the power source exchange job to the selected power source exchange station and assigning the energy replenishment task in the power source exchange job to the robot.

When the selected power source exchange station receives the robot service task, the power source exchange station can inspect the robot service task, extract the identifier of the robot, retrieve a power configuration of the robot using the identifier, determine what energy source components on the robot would need to be charged or replaced, and determine whether the selected power source exchange station needs to travel to the location of the power source exchange operation. The selected power source exchange station can retrieve the power configuration of the robot from a database or from the robot service task. For example, the robot service task can include robot configuration data.

In some examples, the robot controller can be configured to energy replenishment tasks as high priority tasks. When the robot receives the energy replenishment task, the robot can inspect the energy replenishment task and determine the travel mode to the location of the power source exchange operation. If the travel model is ride mode, the robot can request a mobile base to transport the robot to the location of the power source exchange operation. The robot can travel to the location of the power source exchange for the power source exchange operation.

When the robot and the selected power source exchange station are at the power source exchange location, the selected power source exchange station can verify the identity of the robot. After verifying the identity of the robot, the selected power source exchange station can offload energy source components from the robot and load replacement energy source components onto the robot. Prior to offloading energy source components from the robot, the robot can connect to a secondary electrical power source on-board the robot or to an external electrical power source. If an external electrical power source is used, the external electrical power source can be disconnected from the robot after loading the replacement energy source components onto the robot.

The robot can return to its tasks once the power source exchange operation is completed. In some examples, the central controller and/or fleet system controller can continue to receive real-time updates from the robot and the selected power source exchange station and can detect when the power source exchange job has been completed.

At 1516, the method includes generating a mobile base charging job for the robot and a selected mobile base. In some examples, the central controller and/or the fleet system controller can generate the mobile base charging job.

The method can include identifying mobile bases from a mobile base fleet that can perform a mobile base charging operation for the robot (e.g., based on the configuration of the robot or whether the mobile base itself has enough stored energy or access to a power supply). If there are multiple mobile bases that can perform the mobile base charging operation, the method can select one of the mobile bases based on criteria such as availability of the mobile base to perform the mobile charging operation within a given time-frame and proximity of the mobile base to the robot. In some cases, the robot may be in a ride mode and the mobile base currently associated with the robot may be the identified mobile base that can perform the mobile charging operation. To enable the method to select the appropriate mobile base, the method can include receiving real-time updates from the mobile bases about the jobs on the job stack of the mobile bases. For example, the mobile base controllers in the mobile bases can transmit real-time updates to the central controller and/or fleet system controller.

The method can include determining a suitable location for the mobile base charging job. In some examples, the suitable location can be the current location of the robot or a location within a short distance from the current location of the robot (e.g., if the robot is currently at a location that is not easily accessible by a mobile base).

The mobile base charging job can include a robot charging task for the selected mobile base and an energy replenishment task for the robot. The robot charging task can specify a robot identifier, a message that the robot having the identifier needs to be charged, and an expected pickup location for the robot. The energy replacement task can include a message that the robot needs to be charged, an identifier of the mobile base that will perform the charging, and an expected pickup location for the robot.

At 1518, the method can include initiating a mobile charging operation based on the mobile charging job. The method can initiate the mobile charging operation by assigning the robot charging task in the mobile charging job to the selected mobile base and assigning the energy replenishment task in the mobile charging job to the robot.

In some examples, after the selected mobile base receives the robot charging task, the selected mobile base can automatically travel to the expected pickup location of the robot specified in the robot charging task. In other examples, after the robot receives the energy replenishment task, the robot controller can travel to the expected pickup location of the robot and summon the mobile base identified in the energy replenishment task from the expected pickup location.

At the expected pickup location of the robot, the robot can be docked on the mobile base (e.g., sit or stand on the mobile base) and charged by the mobile base. After the robot has been docked on the mobile base, the travel mode of the robot can be changed to a ride mode. In some examples, the robot can continue performing tasks while being charged by the mobile base. When the robot has been sufficiently charged, the robot can dismount the mobile base and switch to a walk mode.

At 1520, the method can include generating a wall charging task for the robot. In some examples, the central controller and/or the fleet system controller can generate the wall charging job.

The method can include identifying a wall charger in close proximity to the robot.

The method can include determining the travel mode of the robot to the location of the wall charging operation. If the robot is in walk mode, the method can determine if the robot requires transportation to the location of the wall charger. If the robot does not have sufficient energy to walk to the location of the wall charger, the method can determine that the robot will need a mobile base to ride to the location of the wall charger.

The wall charging task can specify an identifier of the robot, a location of the wall charger, and an expected travel mode of the robot to the location of the wall charger.

At 1522, the method can initiate the wall charging operation by assigning the wall charging task to the robot. When the robot receives the wall charging task, the robot controller can determine whether to complete a current task or immediately execute the wall charging task. If the robot requires transportation to the wall charger and is not currently in a ride mode, the robot controller can summon a mobile base for transportation to the wall charger. If the robot is already in a ride mode, the robot can command the mobile base to take the robot to the wall charger. At the location of the wall charger, the robot can plug itself into the wall charger for charging.

Additional Implementations

The robot systems, methods, control modules, and computer program products described herein may, in some examples, employ any of the teachings of U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0130607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/253,591, U.S. Provisional Patent Application Ser. No. 63/293,968, U.S. Provisional Patent Application Ser. No. 63/293,973, U.S. Provisional Patent Application Ser. No. 63/278,817, and/or U.S. patent application Ser. No. 17/566,589, each of which is incorporated herein by reference in its entirety.

Additional Examples

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A fleet system comprising: a fleet of mobile bases, each mobile base comprising a chassis and a propulsion system, the chassis having a platform, the propulsion system coupled to the chassis and operable to propel the chassis within an environment; a fleet of humanoid robots, each humanoid robot comprising a torso and two robotic legs, wherein the humanoid robot has a first locomotion mode in which the humanoid robot is supported on the platform of a given mobile base and travel of the humanoid robot within the environment is by movement of the given mobile base within the environment and a second locomotion mode in which the humanoid robot is not supported on any of the platforms of the mobile bases and travel of the humanoid robot within the environment is by movement of the two robotic legs; and a fleet system controller comprising at least one processor and at least one non-transitory processor-readable memory, the fleet system controller communicatively coupled to the fleet of mobile bases and the fleet of humanoid robots, wherein the fleet systems controller receives operational state data from the humanoid robots and the mobile bases and schedules tasks for the humanoid robots and the mobile bases based on the operational state data.

Example 2: A fleet system according to any example herein, particularly Example 1, wherein the fleet system controller communicates with the fleet of mobile bases and the fleet of humanoid robots over a wireless network.

Example 3: A fleet system according to any example herein, particularly any one of Examples 1-2, wherein the humanoid robots are autonomous.

Example 4: A fleet system according to any example herein, particularly any one of Examples 1-3, wherein the mobile bases are non-humanoid robots.

Example 5: A fleet system of according to any example herein, particularly any one of Examples 1-4, wherein at least one of the mobile bases comprises at least one robotic arm and an end effector coupled to the at least one robotic arm.

Example 6: A fleet system according to any example herein, particularly any one of Examples 1-5, wherein at least one of the mobile bases comprises a hitch system for pulling a load.

Example 7: A fleet system according to any example herein, particularly any one of Examples 1-6, wherein the mobile bases are autonomous.

Example 8: A fleet system according to any example herein, particularly any one of Examples 1-7, each of the mobile bases further comprises a plurality of wheels coupled to the respective chassis, and wherein the respective propulsion system is coupled to at least one of the plurality of wheels.

Example 9: A fleet system according to any example herein, particularly Example 8, wherein at least one of the mobile bases further comprises a steering wheel coupled to the respective at least one of the plurality of wheels, wherein a direction of travel of the mobile base within an environment is controllable by the steering wheel.

Example 10: A fleet system according to any example herein, particularly any one of Examples 1-9, wherein the platform of at least one of the mobile bases includes at least one seat for at least one of the humanoid robots.

Example 11: A fleet system according to any example herein, particularly any one of Examples 1-10, wherein the platform of at least one of the mobile bases is configured to support multiple humanoid robots simultaneously.

Example 12: A fleet system according to any example herein, particularly any one of Examples 1-11, wherein each of the humanoid robots comprises a first electrical power source having a first stored energy level that changes with energy usage of the humanoid robot, and wherein the humanoid robot has a low power state when the first stored energy level is below a first threshold.

Example 13: A fleet system according to any example herein, particularly Example 12, wherein the controller is configured to detect a low power state of a given humanoid robot from the operational data of the given humanoid robot and schedule a task to replenish the first electrical power source of the given humanoid robot in response to the low power state of the given humanoid robot.

Example 14: A fleet system according to any example herein, particularly any one of Examples 12-13, wherein each mobile base comprises a second electrical power source having a second stored energy level that changes with energy usage of the mobile base, and wherein the mobile base has a low power state when the second stored energy level is below a second threshold.

Example 15: A fleet system according to any example herein, particularly Example 14, wherein each humanoid robot includes a first charging interface connected to the respective first electrical power source, and wherein each mobile base includes a second charging interface connected to the respective second electrical power source.

Example 16: A fleet system according to any example herein, particularly Example 15, wherein the first charging interface comprises a first wireless charger receiver disposed on one of the two robotic legs of the humanoid robot, wherein the second charging interface comprises a first wireless charger transmitter disposed on the platform of the mobile base, and wherein the first wireless charger receiver of a given humanoid robot in the first locomotion mode wirelessly couples with the first wireless charger transmitter of a given mobile base to transfer energy from the second electrical power source of the given mobile base to the first electrical power source of the given humanoid robot.

Example 17: A fleet system according to any example herein, particularly Example 16, wherein the first wireless charger transmitter comprises a first induction coil, and wherein the first wireless charger receiver comprises a second induction coil.

Example 18: A fleet system according to any example herein, particularly Example 15, wherein the second charging interface comprises a charging port, and wherein the first charging interface comprises a charging cable receivable in the charging port.

Example 19: A fleet system according to any example herein, particularly any one of Examples 15-18, wherein each mobile base further comprises a third charging interface connected to the respective second electrical power source, and wherein the third charging interface comprises a charging port or a wireless charger receiver.

Example 20: A fleet system according to any example herein, particularly any one of Examples 12-19, wherein each humanoid robot comprises a secondary electrical power source usable as a backup electrical power source, and wherein the humanoid robot further comprises an electrical charging path formed between the first electrical power source of the humanoid robot and the secondary electrical power source.

Example 21: A fleet system according to any example herein, particularly any one of Examples 12-20, further comprising at least one power source exchange station comprising a repository of replacement electrical power sources for at least one of the fleets of humanoid robots or the fleet of mobile bases.

Example 22: A fleet system according to any example herein, particularly Example 21, wherein the fleet system controller is communicatively coupled to the at least one power source exchange station and is configured to schedule tasks for the power source exchange station.

Example 23: A fleet system according to any example herein, particularly any one of Examples 1-22, wherein at least one of the humanoid robots comprises a hydraulic power unit physically coupled to the respective torso.

Example 24: A fleet system according to any example herein, particularly Example 23, wherein the at least one of the humanoid robots comprises at least one arm coupled to the respective torso and a hand coupled to the at least one arm, wherein the hand comprises at least one digit and at least one hydraulic actuator arranged to articulate the at least one digit, and wherein the at least one hydraulic actuator is operably coupled to the hydraulic power unit.

Example 25: A mobile base comprising: a chassis having a platform, the platform having a first platform area sized and dimensioned to receive a humanoid robot; a plurality of wheels coupled to the chassis; a propulsion system coupled to the chassis and at least one of the plurality of wheels, wherein the propulsion system is operable to propel the chassis within an environment; a mobile base controller comprising at least one processor and at least one non-transitory processor-readable memory, the controller configured to control navigation of the chassis within the environment; an electrical power source coupled to the propulsion system and the mobile base controller, the electrical power source having a stored energy level that changes with energy usage of the propulsion system and mobile base controller; and a first charging interface coupled to the first platform area and electrically connected to the electrical power source, the first charging interface including at least one of a charging port or wireless charger transmitter for charging a humanoid robot received on the first platform area.

Example 26: A mobile base according to any example herein, particularly Example 25, wherein the platform includes one or more additional platform areas, each additional platform area sized and dimensioned to receive a humanoid robot.

Example 27: A mobile base according to any example herein, particularly Example 26, further comprising one or more additional charging interfaces, each additional charging interface coupled to a respective additional platform area and electrically connected to the electrical power source, each additional charging interface including at least one of a charging port or wireless charger transmitter for charging a humanoid robot received on the respective additional platform area.

Example 28: A mobile base according to any example herein, particularly any one of Examples 25-27, further comprising a wireless communication interface configured to transmit and receive data, wherein the wireless communication interface is coupled to the mobile base controller.

Example 29: A mobile base according to any example herein, particularly any one of Examples 25-28, further comprising at least one image sensor arranged to capture data from the environment, wherein the at least one image sensor is communicatively coupled to the mobile base controller.

Example 30: A mobile base according to any example herein, particularly any one of Examples 25-29, further comprising a steering wheel coupled to at least one of the plurality of wheels, wherein a direction of travel of the mobile base within an environment is controllable by the steering wheel.

Example 31: A mobile robot system comprising: a mobile base comprising a chassis and a propulsion system, the chassis having a platform, the propulsion system coupled to the chassis and operable to propel the chassis within an environment; and a humanoid robot comprising a torso and two robotic legs, wherein the humanoid robot has a first locomotion mode in which the humanoid robot is supported on the platform and travel of the humanoid robot within the environment is by movement of the mobile base within the environment and a second locomotion mode in which the humanoid robot is not supported on the platform and travel of the humanoid robot within the environment is by movement of the two robotic legs.

Example 32: A mobile robot system according to any example herein, particularly Example 31, wherein the humanoid robot is autonomous.

Example 33: A mobile robot system according to any example herein, particularly any one of Examples 31-32, wherein the mobile base is a non-humanoid robot.

Example 34: A mobile robot system according to any example herein, particularly any one of examples 31-33, wherein the mobile base comprises at least one articulated robotic tool coupled to the chassis.

Example 35: A mobile robot system according to any example herein, particularly any one of Examples 31-34, wherein the mobile base comprises a hitch system coupled to the chassis.

Example 36: A mobile robot system according to any example herein, particularly any one of Examples 31-35, wherein the mobile base further comprises a plurality of wheels coupled to the chassis, and wherein the propulsion system is coupled to at least one of the plurality of wheels.

Example 37: A mobile robot system according to any example herein, particularly Example 36, wherein the mobile base further comprises a steering wheel coupled to at least one of the plurality of wheels, wherein a direction of travel of the mobile base within an environment is controllable by the steering wheel.

Example 38: A mobile robot system according to any example herein, particularly any one of Examples 31-37, wherein the mobile base comprises a mobile base controller and a first wireless communication interface coupled to the mobile base controller.

Example 39: A mobile robot system according to any example herein, particularly Example 38, wherein the humanoid robot comprises a robot controller and a second wireless communication interface coupled to the robot controller, and wherein the mobile base controller and the humanoid robot controller communicate over a wireless network and through the first and second wireless communication interfaces.

Example 40: A mobile robot system according to any example herein, particularly any one of Examples 31-39, wherein the platform includes a seat for the humanoid robot.

Example 41: A mobile robot system according to any example herein, particularly any one of Examples 31-40, wherein the platform includes multiple platform areas to support multiple humanoid robots simultaneously.

Example 42: A mobile robot system according to any example herein, particularly any one of Examples 31-41, wherein the humanoid robot comprises a first electrical power source having a first stored energy level that changes with energy usage of the humanoid robot, and wherein the humanoid robot has a low power state when the first stored energy level is below a first threshold.

Example 43: A mobile robot system according to any example herein, particularly Example 42, wherein the mobile base comprises a second electrical power source having a second stored energy level that changes with energy usage of the mobile base, and wherein the mobile base has a low power state when the second stored energy level is below a second threshold.

Example 44: A mobile robot system according to any example herein, particularly Example 43, wherein the humanoid robot includes a first charging interface connected to the first electrical power source, wherein the mobile base includes a second charging interface connected to the second electrical power source.

Example 45: A mobile robot system according to any example herein, particularly Example 44, wherein the first charging interface comprises a wireless charger receiver disposed on one of the two robotic legs, wherein the second charging interface comprises a wireless charger transmitter disposed on the platform, and wherein the wireless charger receiver selectively wirelessly couples with the wireless charger transmitter to transfer energy from the second electrical power source to the first electrical power source in the first locomotion mode.

Example 46: A mobile robot system according to any example herein, particularly Example 45, wherein the wireless charger transmitter comprises a first induction coil, and wherein the wireless charger receiver comprises a second induction coil.

Example 47: A mobile robot system according to any example herein, particularly Example 44, wherein the second charging interface comprises a charging port, and wherein the first charging interface comprises a charging cable receivable in the charging port.

Example 48: A mobile robot system according to any example herein, particularly any one of Examples 42-47, wherein the humanoid robot comprises a secondary electrical power source usable as a backup electrical power source, and wherein the humanoid robot further comprises an electrical charging path formed between the first electrical power source and the secondary electrical power source.

Example 49: A mobile robot system according to any example herein, particularly any one of Examples 31-48, further comprising a hydraulic power unit coupled to the humanoid robot.

Example 50: A mobile robot system according to any example herein, particularly any one of Examples 31-49, wherein the humanoid robot further comprises at least one arm coupled to the torso and a hand coupled to the at least one arm, wherein the hand comprises at least one digit and at least one hydraulic actuator arranged to articulate the at least one digit, and wherein the at least one hydraulic actuator is operably coupled to the hydraulic power unit.

Example 51: A mobile robot system comprises a robot and a mobile base. The robot comprises a torso, a first robotic arm mechanically coupled to the torso, a first robotic leg, and a second robotic leg, wherein the first robotic leg and the second robotic leg are controllably actuatable to enable the robot to execute bipedal walking. The mobile base comprises a platform to receive a lower end of the first robotic leg and a lower end of the second robotic leg, at least one wheel and a controllable steering mechanism to enable the mobile base to travel both while the robot is positioned on the platform and while the robot is not positioned on the platform, and a plurality of components, at least one component of the plurality of components operable to support at least one function of the robot.

Example 52: The mobile robot system of Example 51, wherein the robot is capable of autonomous travel.

Example 53: The mobile robot system of Example 51, further comprising a hydraulic system, wherein at least one component of the hydraulic system is housed in the robot body.

Example 54: The mobile robot system of Example 53, wherein the hydraulic system is operable to cause a motion of at least one of the first robotic leg, the second robotic leg, and the first robotic arm.

Example 55: The mobile robot system of Example 53, wherein at least one of the plurality of components of the mobile base is a component of the hydraulic system, and wherein the component of the hydraulic system is hydraulically coupleable to the robot.

Example 56: The mobile robot system of Example 51, further comprising a controller operable to control action of the robot.

Example 57: The mobile robot system of Example 56, wherein at least one of the plurality of components of the mobile base is the controller, and wherein the controller is communicatively coupled to the robot.

Example 58: The mobile robot system of Example 51, wherein at least one of the plurality of components of the mobile base is a first primary electrical power source operable to provide electrical power to the mobile base.

Example 59: The mobile robot system of Example 58, wherein the robot further comprises a second primary electrical power source operable to provide electrical power to the robot body, a controller comprising at least one processor, and at least one non-transitory processor-readable storage medium communicatively coupled to the at least one processor, the at least one non-transitory processor-readable storage medium storing processor-executable instructions and/or data that, when executed by the at least one processor, cause the robot to identify a low-power condition of the second primary electrical power source of the robot body and in response to identifying the low-power condition, establish an electrical communicative coupling between the first primary electrical power source of the mobile base and the second primary electrical power source of the robot body to recharge the second primary electrical power source of the robot body using the first electrical power source of the mobile base.

Example 60: The mobile robot system of Example 59, wherein the electrical communicative coupling between the first primary electrical power source of the mobile base and the second primary electrical power source of the robot is a tethered electrical communicative coupling between the mobile base and the robot.

Example 61: The mobile robot system of Example 60, wherein the tethered electrical communicative coupling between the mobile base and the robot body includes an electrical cable.

Example 62: The mobile robot system of Example 59, wherein the electrical communicative coupling between the first primary electrical power source of the mobile base and the second primary electrical power source of the robot is a wireless electrical communicative coupling between the mobile base and the robot.

Example 63: The mobile robot system of Example 62, wherein the wireless electrical communicative coupling between the mobile base and the robot body is an inductive coupling.

Example 64: The mobile robot system of Example 58, wherein the mobile base further includes a secondary electrical power source, and wherein the robot further comprises a second primary electrical power source operable to provide electrical power to the robot, a controller comprising at least one processor, and at least one non-transitory processor-readable storage medium storing processor-executable instructions and/or data that, when executed by the at least one processor, cause the robot to identify a low-power condition of the second primary electrical power source of the robot and in response to identifying the low-power condition, exchange the second primary electrical power source of the robot for the secondary power source of the mobile base.

Example 65: The mobile robot system of Example 64, wherein the processor-executable instructions and/or data that, when executed by the at least one processor, cause the robot to exchange the second primary electrical power source of the robot body for the secondary power source of the mobile base, cause the robot to walk to the mobile base.

Example 66: The mobile robot system of Example 64, wherein the processor-executable instructions and/or data that, when executed by the at least one processor, cause the robot to exchange the second primary electrical power source of the robot for the secondary power source of the mobile base, cause the mobile base to travel to the robot.

Example 67: The mobile robot system of Example 51, wherein the mobile robot system further comprises a controller, and wherein the controller is operable to control an action of the robot.

Example 68: The mobile robot system of Example 51, wherein the robot further comprises a second robotic arm, and wherein the second robotic arm is mechanically coupled to the torso.

Example 69: The mobile robot system of Example 51, wherein the mobile base further comprises a propulsion system, the propulsion system operable to cause a motion of the mobile base.

Example 70: The mobile robot system of Example 51, wherein the mobile base is capable of autonomous movement.

Example 71: The mobile robot system of Example 51, wherein robot is configurable in a plurality of articulations, wherein the mobile base has at least one of a weight, a shape, or a measurable extent to ensure the robot is stable for each of the plurality of articulations of the robot.

The invention claimed is:

1. A mobile robot system comprising:

a mobile base comprising a chassis and a propulsion system, the chassis having a platform, the propulsion system coupled to the chassis and operable to propel the chassis within an environment; and a humanoid robot comprising:

a torso and two robotic legs, each robotic leg having a foot, wherein the humanoid robot has a first locomotion mode in which the humanoid robot is supported on the platform and travel of the humanoid robot within the environment is by movement of the mobile base within the environment and a second locomotion mode in which the humanoid robot is not supported on the platform and travel of the humanoid robot within the environment is by movement of the two robotic legs;

a first electrical power source attached to the torso and having a first stored energy level that changes with energy usage of the humanoid robot, wherein the humanoid robot has a low power state when the first stored energy level is below a first threshold; and a wireless charger receiver attached to the foot of one of the two robotic legs and connected to the first electrical power source.

2. The mobile robot system of claim 1, wherein the humanoid robot is autonomous.

3. The mobile robot system of claim 1, wherein the mobile base is autonomous.

4. The mobile robot system of claim 1, wherein the mobile base comprises a hitch system coupled to the chassis.

5. The mobile robot system of claim 1, wherein the platform includes a seat for the humanoid robot.

6. The mobile robot system of claim 1, wherein the platform includes multiple platform areas to support multiple humanoid robots simultaneously.

7. The mobile robot system of claim 1, wherein the mobile base further comprises a plurality of wheels coupled to the chassis, and wherein the propulsion system is coupled to at least one of the plurality of wheels.

8. The mobile robot system of claim 1, wherein the mobile base comprises a mobile base controller and a first wireless communication interface coupled to the mobile base controller, wherein the humanoid robot comprises a robot controller and a second wireless communication interface coupled to the robot controller, and wherein the mobile base controller and the humanoid robot controller communicate over a wireless network and through the first and second wireless communication interfaces.

9. The mobile robot system of claim 1, wherein the mobile base comprises a second electrical power source having a second stored energy level that changes with energy usage of the mobile base, and wherein the mobile base has a low power state when the second stored energy level is below a second threshold.

10. The mobile robot system of claim 9, wherein the mobile base comprises a wireless charger transmitter disposed on the platform, and wherein the wireless charger receiver selectively wirelessly couples with the wireless charger transmitter to transfer energy from the second electrical power source to the first electrical power source when the humanoid robot is in the first locomotion mode.

11. The mobile robot system of claim 1, wherein the humanoid robot comprises a secondary electrical power source usable as a backup electrical power source, and wherein the humanoid robot further comprises an electrical charging path formed between the first electrical power source and the secondary electrical power source.

12. The mobile robot system of claim 1, further comprising a hydraulic power unit coupled to the humanoid robot, wherein the humanoid robot further comprises at least one arm coupled to the torso and a hand coupled to the at least one arm, wherein the hand comprises at least one digit and at least one hydraulic actuator arranged to articulate the at least one digit, and wherein the at least one hydraulic actuator is operably coupled to the hydraulic power unit.

13. A fleet system comprising:

a fleet of mobile bases, each mobile base comprising a chassis and a propulsion system, the chassis having a platform, the propulsion system coupled to the chassis and operable to propel the chassis within an environment;

a fleet of humanoid robots, each humanoid robot comprising:

a torso and two robotic legs, each robotic leg having a foot, wherein the humanoid robot has a first locomotion mode in which the humanoid robot is supported on the platform of a given mobile base and travel of the humanoid robot within the environment is by movement of the given mobile base within the environment and a second locomotion mode in which the humanoid robot is not supported on any of the platforms of the mobile bases and travel of the humanoid robot within the environment is by movement of the two robotic legs;

a first electrical power source attached to the torso and having a first stored energy level that changes with energy usage of the humanoid robot, wherein the humanoid robot has a low power state when the first stored energy level is below a first threshold; and a wireless charger receiver attached to the foot of one of the two robotic legs and connected to the first electrical power source; and a fleet system controller comprising at least one processor and at least one non-transitory processor-readable memory, the fleet system controller communicatively coupled to the fleet of mobile bases and the fleet of humanoid robots, wherein the fleet systems controller receives operational state data from the humanoid robots and the mobile bases and schedules tasks for the humanoid robots and the mobile bases based on the operational state data.

14. The fleet system of claim 13, wherein the fleet system controller is configured to detect the low power state of a given humanoid robot in the fleet of humanoid robots from the operational data of the given humanoid robot and schedule a task to replenish the first electrical power source of the given humanoid robot in response to the low power state of the given humanoid robot.

15. The fleet system of claim 13, wherein each mobile base comprises a second electrical power source having a second stored energy level that changes with energy usage of the mobile base, and wherein the mobile base has a low power state when the second stored energy level is below a second threshold.

16. The fleet system of claim 15, wherein each mobile base comprises a first wireless charger transmitter disposed on the platform of the mobile base, and wherein the first wireless charger receiver of a given humanoid robot in the fleet of humanoid robots wirelessly couples with the first wireless charger transmitter of a given mobile base in the fleet of mobile bases to transfer energy from the second electrical power source of the given mobile base to the first electrical power source of the given humanoid robot when the given humanoid robot is in the first locomotion mode.

17. The fleet system of claim 15, further comprising at least one power source exchange station comprising a repository of replacement electrical power sources for at least one of the fleet of humanoid robots or the fleet of mobile bases, wherein the fleet system controller is communicatively coupled to the at least one power source exchange station and is configured to schedule tasks for the power source exchange station.

* * * * *